(12) United States Patent
Devi et al.

(10) Patent No.: US 11,204,591 B2
(45) Date of Patent: Dec. 21, 2021

(54) MODELING AND CALCULATING NORMALIZED AGGREGATE POWER OF RENEWABLE ENERGY SOURCE STATIONS

(71) Applicant: International Business Machines Corporation, Armonk, NY (US)

(72) Inventors: Umamaheswari Devi, Bangalore (IN); Amith Singhee, Bangalore (IN); Mathieu Sinn, Dublin (IE); Vincent Lonij, Dublin (IE); Amar P. Azad, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 759 days.

(21) Appl. No.: 15/815,790

(22) Filed: Nov. 17, 2017

(65) Prior Publication Data
US 2019/0155234 A1    May 23, 2019

(51) Int. Cl.
*G05B 17/02* (2006.01)
*G06F 9/50* (2006.01)
(Continued)

(52) U.S. Cl.
CPC .............. *G05B 17/02* (2013.01); *G01W 1/10* (2013.01); *G06F 9/5072* (2013.01); *G06F 30/20* (2020.01);
(Continued)

(58) Field of Classification Search
None
See application file for complete search history.

(56) References Cited

U.S. PATENT DOCUMENTS

| 2015/0066442 A1* | 3/2015 | Pryor | G06Q 10/10 |
| | | | 703/1 |
| 2015/0317589 A1 | 11/2015 | Anderson et al. | |

FOREIGN PATENT DOCUMENTS

| AU | 2016210607 A1 | 8/2016 |
| AU | 2015276877 A1 | 1/2017 |
| CN | 102722760 B | 5/2015 |

OTHER PUBLICATIONS

Lorenz et al., Regional PV power prediction for improved grid integration, 2010, Wiley Online Library, pp. 757-771 (Year: 2010).*

(Continued)

*Primary Examiner* — Omar F Fernandez Rivas
*Assistant Examiner* — Bernard E Cothran
(74) *Attorney, Agent, or Firm* — Jared C. Chaney

(57) ABSTRACT

The present invention provides a method, system, and computer program product of modeling and calculating aggregate power of a set of renewable energy source stations using power output from representative renewable energy source stations. In an embodiment, the present invention includes receiving location, power output time series, and weather time series data of renewable energy source stations in a geographic region and aggregate power output time series data for the geographic region, for each cluster of stations, normalizing the aggregate power value to a representative renewable energy source station, learning a regression model, and de-normalizing a normalized aggregate output power model with respect to a maximum possible power value, and applying a combined model to the received data and power output of representative renewable energy source stations for a particular day, resulting in a total aggregate power value of the renewable energy source stations for the particular day.

20 Claims, 12 Drawing Sheets

(51) Int. Cl.
*H04L 29/08* (2006.01)
*H02J 3/38* (2006.01)
*G01W 1/10* (2006.01)
*G06N 20/00* (2019.01)
*G06Q 50/06* (2012.01)
*G06F 30/20* (2020.01)
*G06F 17/18* (2006.01)
*G06F 119/06* (2020.01)

(52) U.S. Cl.
CPC ............. *G06N 20/00* (2019.01); *G06Q 50/06* (2013.01); *H02J 3/382* (2013.01); *H04L 67/1002* (2013.01); *G06F 17/18* (2013.01); *G06F 2119/06* (2020.01); *H02J 2203/20* (2020.01); *H04L 67/12* (2013.01); *H04L 67/18* (2013.01)

(56) References Cited

OTHER PUBLICATIONS

Zhang et al., Predicting Rooftop Solar Adoption Using Agent-BASED Modeling, 2014, Sandia National Laboratories, pp. 44-51 (Year: 2014).*

Omar et al., Day-Ahead Forecasting for Photovoltaic Power Using Artificial Neural Networks Ensembles, 2016, IEEE, pp. 1152-1157 (Year: 2016).*

Huang et al., Comparative Study of Power Forecasting Methods for PV Stations, 2010, IEEE, pp. 1-6 (Year: 2010).*

Liang et al., An Active Power Control Strategy for Large-scale Clusters of Photovoltaic Power Stations, 2014, IEEE, pp. 1-5 (Year: 2014).*

Lorenz, et al., "Regional PV power prediction for improved grid integration," Paper presented at 25th EU PVSEC WCPEC-5, vol. 19, Issue 7, Valencia, Spain, 2010, DOI: 10.1002/pip.1033, Abstract Only, 2 pages.

Mell, et al., "The NIST Definition of Cloud Computing," Recommendations of the National Institute of Standards and Technology, U.S. Department of Commerce, NIST Special Publication 800-145, Sep. 2011, 7 pages.

Dash, et al., "Feature Selection for Clustering—A Filter Solution," ResearchGate, Conference Paper, Feb. 2002, 10 pages, DOI: 10.1109/ICDM.2002.1183893 https://www.researchgate.net/publication/4006028_Feature_Selection_for_Clustering_-_A_Filter_Solution.

* cited by examiner

MODELING AND CALCULATING NORMALIZED AGGREGATE POWER OF RENEWABLE ENERGY SOURCE STATIONS

BACKGROUND

The present disclosure relates to electrical power, and more specifically, to modeling and calculating aggregate power of a set of renewable energy source stations using power output from representative renewable energy stations.

SUMMARY

The present invention provides a computer implemented method, a system, and a computer program product of modeling and calculating aggregate power of a set of renewable energy source stations using power output from representative renewable energy source stations (i.e., a few representative stations). In an exemplary embodiment, the computer implemented method, the system, and the computer program product include (1) receiving, by a computer system, location data of a plurality of renewable energy source stations in a geographic region, power output time series data of each of the plurality of renewable energy source stations, weather time series data of weather parameters corresponding to the plurality of renewable energy source stations, and aggregate power output time series data for the geographic region, (2) clustering, by the computer system, the plurality of renewable energy source stations according to a clustering metric, resulting in clusters of renewable energy source stations, (3) for each of the clusters, designating, by the computer system, a renewable energy source station among the plurality of renewable energy source stations to be a representative renewable energy source station of the each of the clusters based on at least an aggregate power value among the aggregate power output time series data, (4) for the each of the clusters, determining, by the computer system, a set of features corresponding to the representative renewable energy source station of the each of the clusters, resulting in a determined set of features of the each of the clusters, (5) for the each of the clusters, executing, by the computer system, a set of logical operations normalizing the aggregate power value to the representative renewable energy source station of the each of the clusters with respect to a maximum of aggregate power values in the aggregate power output time series data (i.e., aggregate power value time series of the cluster), resulting in a normalized aggregate output power value of the representative renewable energy source station of the each of the clusters, (6) for the each of the clusters, executing, by the computer system, a set of logical operations learning a regression model of the each of the clusters based on the determined set of features of the each of the clusters and the normalized aggregate output power value of the representative renewable energy source station of the each of the clusters, resulting in learned regression models of the clusters of renewable energy source stations, (7) for the each of the clusters, executing, by the computer system, a set of logical operations de-normalizing a normalized aggregate output power model of the each of the clusters, among the learned regression models, with respect to a maximum possible power value, resulting in a de-normalized aggregate output power model of the each of the clusters, (8) executing, by the computer system, a set of logical operations combining the learned regression models of the clusters of renewable energy source stations with respect to the de-normalized aggregate output power model of the each of the clusters, resulting in a combined model for aggregate power of the plurality of renewable energy source stations, and (9) executing, by the computer system, a set of logical operations applying the combined model to the location data, the power output time series data, the weather time series data, and power output of representative renewable energy source stations for a particular day, among the power output time series data, resulting in a total aggregate power value of the plurality of renewable energy source stations for the particular day.

DETAILED DESCRIPTION

Figure 1A:
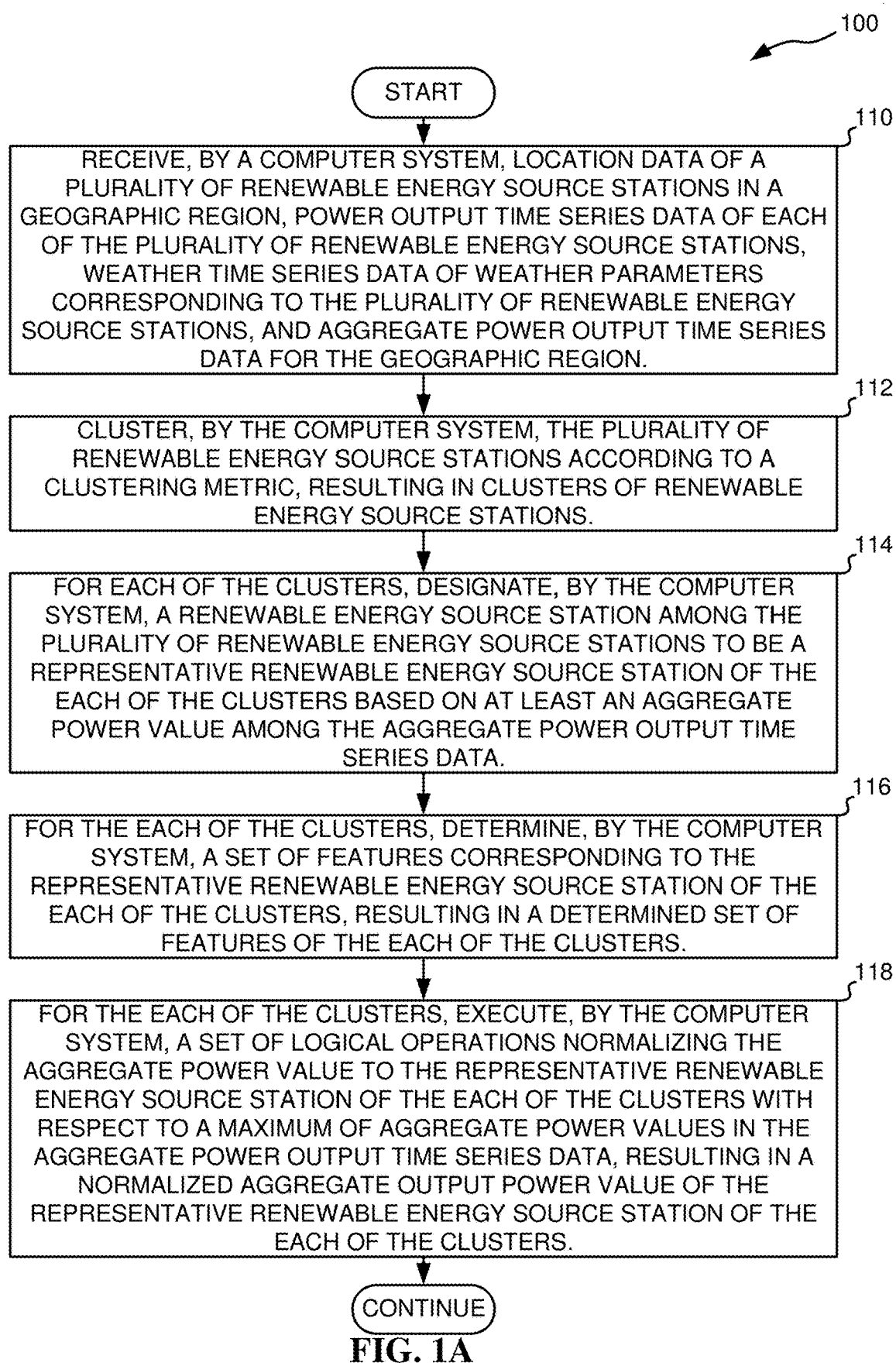
FIG. 1A depicts a flowchart in accordance with an exemplary embodiment of the present invention.

The present invention provides a computer implemented method, a system, and a computer program product of modeling and calculating aggregate power of a set of renewable energy source stations using power output from representative renewable energy source stations (i.e., a few representative stations). In an exemplary embodiment, the computer implemented method, the system, and the computer program product include (1) receiving, by a computer system, location data of a plurality of renewable energy source stations in a geographic region, power output time series data of each of the plurality of renewable energy source stations, weather time series data of weather parameters corresponding to the plurality of renewable energy source stations, and aggregate power output time series data for the geographic region, (2) clustering, by the computer system, the plurality of renewable energy source stations according to a clustering metric, resulting in clusters of renewable energy source stations, (3) for each of the clusters, designating, by the computer system, a renewable energy source station among the plurality of renewable energy source stations to be a representative renewable energy source station of the each of the clusters based on at least an aggregate power value among the aggregate power output time series data, (4) for the each of the clusters, determining, by the computer system, a set of features corresponding to the representative renewable energy source station of the each of the clusters, resulting in a determined set of features of the each of the clusters, (5) for the each of the clusters, executing, by the computer system, a set of logical operations normalizing the aggregate power value to the representative renewable energy source station of the each of the clusters with respect to a maximum of aggregate power values in the aggregate power output time series data (i.e., aggregate power value time series of the cluster), resulting in a normalized aggregate output power value of the representative renewable energy source station of the each of the clusters, (6) for the each of the clusters, executing, by the computer system, a set of logical operations learning a regression model of the each of the clusters based on the determined set of features of the each of the clusters and the normalized aggregate output power value of the representative renewable energy source station of the each of the clusters, resulting in learned regression models of the clusters of renewable energy source stations, (7) for the each of the clusters, executing, by the computer system, a set of logical operations de-normalizing a normalized aggregate output power model of the each of the clusters, among the learned regression models, with respect to a maximum possible power value, resulting in a de-normalized aggregate output power model of the each of the clusters, (8) executing, by the computer system, a set of logical operations combining the learned regression models of the clusters of renewable energy source stations with respect to the de-normalized aggregate output power model of the each of the clusters, resulting in a combined model for aggregate power of the plurality of renewable energy source stations, and (9) executing, by the computer system, a set of logical operations applying the combined model to the location data, the power output time series data, the weather time series data, and power output of representative renewable energy source stations for a particular day, among the power output time series data, resulting in a total aggregate power value of the plurality of renewable energy source stations for the particular day. In an embodiment, the location data describe locations of the plurality of renewable energy source stations. In an embodiment, the set of features includes a power output value, among the power output time series data, of the representative renewable energy source station, weather data, among the weather time series data, describing weather at the representative renewable energy source station, and time data at the representative renewable energy source station.

Definitions

Renewable Energy

Renewable energy is energy that is collected from renewable resources, which are naturally replenished on a human timescale, such as sunlight, wind, rain, tides, waves, and geothermal heat. Renewable energy often provides energy in four important areas: electricity generation, air and water heating/cooling, transportation, and rural (off-grid) energy services. Renewable energy sources include solar energy, wind power, hydropower, geothermal energy, and bio energy.

Renewable energy resources/renewable energy sources exist over wide geographical areas, in contrast to other energy sources, which are concentrated in a limited number of countries. As most of renewable energy resources/renewable energy sources provide electricity, renewable energy deployment is often applied in conjunction with further electrification, which has several benefits (e.g., electricity can be converted to heat (where necessary generating higher temperatures than fossil fuels), can be converted into mechanical energy with high efficiency and is clean at the point of consumption). Electrification with renewable energy is much more efficient and therefore leads to a significant reduction in primary energy requirements, because most renewables do not have a steam cycle with high losses (fossil power plants usually have losses of 40 to 65%).

Solar Energy

Solar energy is radiant light and heat from the Sun that is harnessed using a range of technologies such as solar heating, photovoltaics, solar thermal energy, solar architecture, molten salt power plants and artificial photosynthesis. Solar energy is an important source of renewable energy, and its technologies are broadly characterized as either passive solar or active solar depending on how they capture and distribute solar energy or convert it into solar power. Active solar techniques include the use of photovoltaic systems, concentrated solar power and solar water heating to harness the energy. Passive solar techniques include orienting a building to the Sun, selecting materials with favorable thermal mass or light-dispersing properties, and designing spaces that naturally circulate air.

Active solar technologies encompass solar thermal energy, using solar collectors for heating, and solar power, converting sunlight into electricity either directly using photovoltaics (PV), or indirectly using concentrated solar power (CSP). A photovoltaic (PV) system/photovoltaic station converts light into electrical direct current (DC) by taking advantage of the photoelectric effect. Concentrated solar power (CSP) systems use lenses or mirrors and tracking systems to focus a large area of sunlight into a small beam.

Wind Power

Wind power is the use of air flow through wind turbines to mechanically power generators for electric power. Wind power is plentiful, renewable, widely distributed, clean, produces no greenhouse gas emissions during operation, consumes no water, and uses little land. Wind farms consist of many individual wind turbines which are connected to the electric power transmission network. Onshore wind is an inexpensive source of electric power. Offshore wind is steadier and stronger than on land and has less visual impact, but require higher construction and maintenance costs than onshore wind. Small onshore wind farms could feed some energy into the electrical power grid or provide electric power to isolated off-grid locations. Wind power gives variable power which is very consistent from year to year but which has significant variation over shorter time scales. Power management techniques involving wind power include having excess capacity, geographically distributed turbines, dispatchable backing sources, sufficient hydroelectric power, exporting and importing power to neighboring areas, or reducing demand when wind production is low, can in many cases overcome these problems. Weather forecasting could permit the electric power network to be readied for the predictable variations in production that occur. Areas where winds are stronger and more constant, such as offshore and high-altitude sites, are preferred locations for wind farms.

Hydropower

Hydropower/water power is power derived from the energy of falling water or fast running water, which may be harnessed for useful purposes. Hydropower is used primarily to generate electricity. Broad categories of hydropower include (a) conventional hydroelectric, referring to hydroelectric dams, (b) run-of-the-river hydroelectricity, which captures the kinetic energy in rivers or streams, without a large reservoir and sometimes without the use of dams, (c) small hydro projects generating 10 megawatts or less and often having no artificial reservoirs, (d) micro hydro projects providing a few kilowatts to a few hundred kilowatts to isolated homes, villages, or small industries, (e) conduit hydroelectricity projects utilizing water which has already been diverted for use elsewhere (e.g. in a municipal water system), (f) pumped-storage hydroelectricity storing water pumped uphill into reservoirs during periods of low demand to be released for generation when demand is high or system generation is low, and (g) pressure buffering hydropower using natural sources (e.g., waves) for water pumping to turbines while exceeding water is pumped uphill into reservoirs and releases when incoming water flow is insufficient.

Geothermal Energy

Geothermal energy is heat energy generated and stored in the Earth. Thermal energy is the energy that determines the temperature of matter. The geothermal energy of the Earth's crust originates from the original formation of the planet and from radioactive decay of materials (in currently uncertain but possibly roughly equal proportions). The geothermal gradient, which is the difference in temperature between the core of the planet and its surface, drives a continuous conduction of thermal energy in the form of heat from the core to the surface. Earth's internal heat is thermal energy generated from radioactive decay and continual heat loss from Earth's formation. Rock and water is heated in the crust, sometimes up to 370° C. (700° F.). Geothermal power has historically been limited to areas near tectonic plate boundaries. Such geothermal energy could be used to generate electricity.

Bio Energy

Bio energy is renewable energy made available from materials derived from biological sources. Biomass is any organic material which has stored sunlight in the form of chemical energy. As a fuel it may include wood, wood waste, straw, manure, sugarcane, and many other by-products from a variety of agricultural processes. Such bio energy could be used to generate electricity.

Time Series

A time series/time series data is a series of data points indexed (or listed or graphed) in time order. Most commonly, a time series is a sequence taken at successive equally spaced points in time, such that it is a sequence of discrete-time data. Examples of time series are heights of ocean tides and counts of sunspots. Time series/time series data are very frequently plotted via line charts. Time series are used in statistics, signal processing, pattern recognition, econometrics, mathematical finance, weather forecasting, earthquake prediction, electroencephalography, control engineering, astronomy, communications engineering, and largely in any domain of applied science and engineering which involves temporal measurements.

Time series analysis includes methods for analyzing time series data in order to extract meaningful statistics and other characteristics of the data. Time series forecasting is the use of a model to predict future values based on previously observed values. While regression analysis is often employed in such a way as to test theories that the current values of one or more independent time series affect the current value of another time series, this type of analysis of time series is not called "time series analysis", which focuses on comparing values of a single time series or multiple dependent time series at different points in time. Interrupted time series analysis is the analysis of interventions on a single time series Time series data have a natural temporal ordering, which makes time series analysis distinct from cross-sectional studies, in which there is no natural ordering of the observations (e.g., explaining people's wages by reference to their respective education levels, where the individuals' data could be entered in any order). Time series analysis is also distinct from spatial data analysis where the observations typically relate to geographical locations (e.g., accounting for house prices by the location as well as the intrinsic characteristics of the houses). A stochastic model for a time series will generally reflect the fact that observations close together in time will be more closely related than observations further apart. In addition, time series models will often make use of the natural one-way ordering of time so that values for a given period will be expressed as deriving in some way from past values, rather than from future values. Time series analysis can be applied to real-valued, continuous data, discrete numeric data, or discrete symbolic data (i.e., sequences of characters, such as letters and words in the English language).

Clustering

Clustering or cluster analysis is the task of grouping a set of objects in such a way that objects in the same group (called a cluster) are more similar (in some sense or another) to each other than to those in other groups (clusters). Clustering may be achieved by various algorithms that differ significantly in their notion of what constitutes a cluster and how to efficiently find them, where popular notions of clusters include groups with small distances among the cluster members, dense areas of the data space, intervals or particular statistical distributions. Clustering may be formulated as a multi-objective optimization problem such that the appropriate clustering algorithm and parameter settings (including values such as the distance function to use, a density threshold or the number of expected clusters) depend on the individual data set and intended use of the results. Clustering is an iterative process of knowledge discovery or interactive multi-objective optimization that involves trial and failure such that it is often necessary to modify data preprocessing and model parameters until the result achieves the desired properties.

Normalizing Data

Normalizing data/normalization brings the entire probability distributions of adjusted values into alignment. A different approach to normalization of probability distributions is quantile normalization, where the quantiles of the different measures are brought into alignment. Normalization refers to the creation of shifted and scaled versions of statistics, where the intention is that these normalized values allow the comparison of corresponding normalized values for different datasets in a way that eliminates the effects of certain gross influences, as in an anomaly time series. Some types of normalization involve only a rescaling, to arrive at values relative to some size variable, where such ratios only making sense for ratio measurements (where ratios of measurements are meaningful), not interval measurements (where only distances are meaningful, but not ratios). In theoretical statistics, parametric normalization can often lead to pivotal quantities (i.e., functions whose sampling distribution does not depend on the parameters) and to ancillary statistics (pivotal quantities that can be computed from observations, without knowing parameters). Normalization/normalizing data in statistics include (a) standard score (normalizing errors when population parameters are known) (works well for populations that are normally distributed), (b) student's t-statistic (normalizing residuals when population parameters are unknown (estimated)), (c) studentized residual (normalizing residuals when parameters are estimated, particularly across different data points in regression analysis), (d) standardized moment (normalizing moments, using the standard deviation σ as a measure of scale), (e) coefficient of variation (normalizing dispersion, using the mean μ as a measure of scale, particularly for positive distribution such as the exponential distribution and Poisson distribution), and (f) feature scaling (used to bring all values into the range [0,1]) (also called unity-based normalization) (can be generalized to restrict the range of values in the dataset between any arbitrary points.

Machine Learning

Machine learning is computer software/computer algorithm that can learn from and make predictions on data where such software overcomes following strictly static program instructions by making data-driven predictions or decisions, by through building a model from sample inputs. Machine learning software/algorithms devise complex models and algorithms that lend themselves to prediction, such as predictive analytics, where such analytical models allow researchers, data scientists, engineers, and analysts to produce reliable, repeatable decisions and results and uncover hidden insights through learning from historical relationships and trends in the data. Formally, a machine learning computer software/computer algorithm/computer program is said to learn from experience E with respect to some class of tasks T and performance measure P if its performance at tasks in T, as measured by P, improves with experience E.

Machine Learning Tasks

Machine learning tasks are typically classified into three broad categories, depending on the nature of the learning signal or feedback available to a machine learning software/algorithm/program. A first category is supervised learning, where the computer is presented with example inputs and their desired outputs, given by a teacher, with a goal of the computer learning a general rule that maps inputs to outputs. A second category is unsupervised learning where no labels are given to the machine learning algorithm, leaving it on its own to find structure in its input, with a goal of unsupervised learning (discovering hidden patterns in data) of feature learning. A third category is reinforcement learning where the machine learning computer program interacts with a dynamic environment in which it must perform a certain goal (such as driving a vehicle or playing a game against an opponent), where the machine learning program is provided feedback in terms of rewards and punishments as it navigates its problem space. A fourth category is semi-supervised learning, between supervised and unsupervised learning, where the teacher gives an incomplete training signal (i.e., a training set with some (often many) of the target outputs missing), where transduction is a special case of this principle where the entire set of problem instances is known at learning time, except that part of the targets is missing.

Machine learning tasks may also be categorized according to the desired output of the machine learning software/algorithm/program. For example, for machine learning with classification as the desired output, inputs are divided into two or more classes, and the learner/machine learning software must produce a model that assigns unseen inputs to one or more (multi-label classification) of these classes, where this is typically tackled in a supervised way (e.g., spam filtering, where the inputs are email (or other) messages and the classes are spam and not spam. As another example, for machine learning with regression as the desired output (a supervised problem), the outputs are continuous rather than discrete. In addition, for machine learning with clustering as the desired output, a set of inputs is to be divided into groups, where the groups are not known beforehand, making this typically an unsupervised task. Also, for machine learning with density estimation as the desired output, machine learning finds the distribution of inputs in some space. As another example, for machine learning with dimensionality reduction as the desired output, machine learning simplifies inputs by mapping them into a lower-dimensional space, where topic modeling is a related problem, where a program is given a list of human language documents and is tasked to find out which documents cover similar topics.

Machine Learning Approaches

Machine learning software/algorithms/programs operate via different approaches. For example, decision tree learning uses a decision tree as a predictive model, which maps observations about an item to conclusions about the item's target value. Also, association rule learning is a method for discovering interesting relations between variables in large databases. As another example, support vector machines (SVMs) are a set of related supervised learning methods used for classification and regression, where given a set of training examples, each marked as belonging to one of two categories, an SVM training algorithm builds a model that predicts whether a new example falls into one category or the other. Cluster analysis (unsupervised learning) is the assignment of a set of observations into subsets (called clusters) so that observations within the same cluster are similar according to some predesignated criterion or criteria, while observations drawn from different clusters are dissimilar, where different clustering techniques make different assumptions on the structure of the data, often defined by some similarity metric and evaluated for example by internal compactness (similarity between members of the same cluster) and separation between different clusters, with other methods being based on estimated density and graph connectivity.

Reinforcement learning is a machine learning approach which is concerned with how an agent ought to take actions in an environment so as to maximize some notion of long-term reward, attempting to find a policy that maps states of the world to the actions the agent ought to take in those states, where neither correct input/output pairs are presented nor sub-optimal actions are explicitly corrected. In similarity and metric learning, the machine learning software/algorithm/program is given pairs of examples that are considered similar and pairs of less similar objects and learns a similarity function (or a distance metric function) that can predict if new objects are similar.

Cognitive Computing

Cognitive computing describes technology platforms that are based on the scientific disciplines of artificial intelligence and signal processing. Cognitive computing platforms encompass machine learning, reasoning, natural language processing, speech recognition and vision (object recognition), human-computer interaction, dialog and narrative generation. A cognitive computing platform may be hardware and/or software that mimics the functioning of the human brain and helps to improve human decision-making. A cognitive computing system may learn at scale, reason with purpose, and interact with humans naturally. Cognitive computing systems may express certain features. For example, cognitive computing systems may be adaptive, in that such systems may learn as information changes, and as goals and requirements evolve, may resolve ambiguity and tolerate unpredictability, and may be engineered to feed on dynamic data in real time, or near real time. Cognitive computing systems may be interactive in that they may interact easily with users so that those users can define their needs comfortably, and they may also interact with other processors, devices, and cloud services, as well as with people. Also, cognitive computing systems may be iterative and stateful such that they may aid in defining a problem by asking questions or finding additional source input if a problem statement is ambiguous or incomplete, and they may remember previous interactions in a process and return information that is suitable for the specific application at that point in time. Cognitive computing systems may be contextual in that they may understand, identify, and extract contextual elements such as meaning, syntax, time, location, appropriate domain, regulations, user's profile, process, task and goal, and may draw on multiple sources of information, including both structured and unstructured digital information, as well as sensory inputs (visual, gestural, auditory, or sensor-provided).

Artificial Intelligence

Artificial intelligence is intelligence exhibited by machines, rather than humans or other animals. Artificial intelligence is any device that perceives its environment and takes actions that maximize its chance of success at some goal, where such a machine mimics cognitive functions that humans associate with other human minds, such as learning and problem solving. Artificial intelligence may accomplish reasoning, knowledge, planning, learning, natural language processing (communication), perception and the ability to move and manipulate objects. Artificial intelligence may perform tasks by using statistical methods, computational intelligence, versions of search and mathematical optimization, logic, methods based on probability, and methods based on economics. An intelligent agent artificial intelligence is a system/computer software/computer program/algorithm that perceives its environment and takes actions which maximize its chances of success, such as programs that solve specific problems that use approaches such as symbolic and logical approaches and sub-symbolic neural networks. Agent architectures and cognitive architecture artificial intelligence consist of interacting intelligent agents in a multi-agent system that includes both symbolic and sub-symbolic components that provides a bridge between sub-symbolic artificial intelligence and reactive levels and traditional symbolic intelligence, where relaxed time constraints permit planning and world modelling.

Regression Analysis

Regression analysis is a set of statistical processes for estimating the relationships among variables, possibly resulting in regression models. Regression analysis includes many techniques for modeling and analyzing several variables, when the focus is on the relationship between a dependent variable and one or more independent variables (i.e., predictors). More specifically, regression analysis helps one understand how the typical value of the dependent variable (i.e., criterion variable) changes when any one of the independent variables is varied, while the other independent variables are held fixed. Most commonly, regression analysis estimates the conditional expectation of the dependent variable given the independent variables (i.e., the average value of the dependent variable when the independent variables are fixed). Less commonly, the focus of regression analysis is on a quantile, or other location parameter of the conditional distribution of the dependent variable given the independent variables. In all cases, a function of the independent variables called the regression function is to be estimated.

In regression analysis, it is also of interest to characterize the variation of the dependent variable around the prediction of the regression function using a probability distribution. A related but distinct approach is necessary condition analysis (NCA), which estimates the maximum (rather than average) value of the dependent variable for a given value of the independent variable (ceiling line rather than central line) in order to identify what value of the independent variable is necessary but not sufficient for a given value of the dependent variable. Regression analysis is widely used for prediction and forecasting, where its use has substantial overlap with the field of machine learning. Regression analysis is also used to understand which among the independent variables are related to the dependent variable, and to explore the forms of these relationships. In restricted circumstances, regression analysis can be used to infer causal relationships between the independent and dependent variables.

Many techniques for carrying out regression analysis have been developed. Familiar methods such as linear regression and ordinary least squares regression are parametric, in that the regression function is defined in terms of a finite number of unknown parameters that are estimated from the data. Nonparametric regression refers to techniques that allow the regression function to lie in a specified set of functions, which may be infinite-dimensional. The performance of regression analysis methods in practice depends on the form of the data generating process, and how it relates to the regression approach being used. Since the true form of the data-generating process is generally not known, regression analysis often depends to some extent on making assumptions about this process, with such assumptions sometimes being testable if a sufficient quantity of data is available. Regression models for prediction are often useful even when the assumptions are moderately violated, although they may not perform optimally. In a narrower sense, regression may refer specifically to the estimation of continuous response (dependent) variables, as opposed to the discrete response variables used in classification. The case of a continuous dependent variable may be more specifically referred to as metric regression to distinguish it from related problems.

Current Technologies

Current technologies use simple scaling or clustered scaling to scale the output from representative stations to aggregate power output. Simple scaling chooses representative stations and scale their output to the aggregate using the capacity ratio (of the representatives to the aggregate). Clustered scaling clusters renewable energy source stations using an appropriate distance metric, chooses representative for each cluster, and scale representative outputs to cluster output and aggregate outputs of clusters. Current technology applies machine learning techniques to estimate the missing data points in a physical data stream, where estimation could occur for any data stream when there is a data outage and to forecast values for the next few time instants of one or more time series, such as energy cost and demand, and to forecast values of energy usage in various resources such as building and distribution facilities, to take appropriate scheduling action.

Problems with Current Technologies

Current technologies statistically estimate the ensemble time series of output power using only a sample set of power data. Current technologies do not leverage related information such as weather to handle scenarios where detailed historic power output is not available for some stations, and do not address the problem of estimating in the face of changes to installed capacity. Current technologies (e.g., simple scaling and clustered scaling) have the following limitations: (a) poor accuracy, due to the simplicity of the models used; and (b) applicability limitation due to lack of accurate capacity knowledge and due to dynamic capacity (varying over time) and changes in the number of stations over time. Notably, it has been observed that current technology (i.e., simple dynamic scaling with clusters) yield a mean square error (MSE) of over 40% (comparing upscaled output power data to actual output power data). For efficient integration with the grid, accurate estimate of solar power and power from other renewable energy sources is needed with very few measurements despite their variability and growth. There is a need to predict renewable power output with high accuracy, at least in order to be able to efficiently integrate such power output with an electrical grid. Thus, there is a need to calculate aggregate forecasts of renewable energy source output so that electrical grid operators could at least operate the power system efficiently, allocate reserves, and match supply with demand.

Figure 1B:
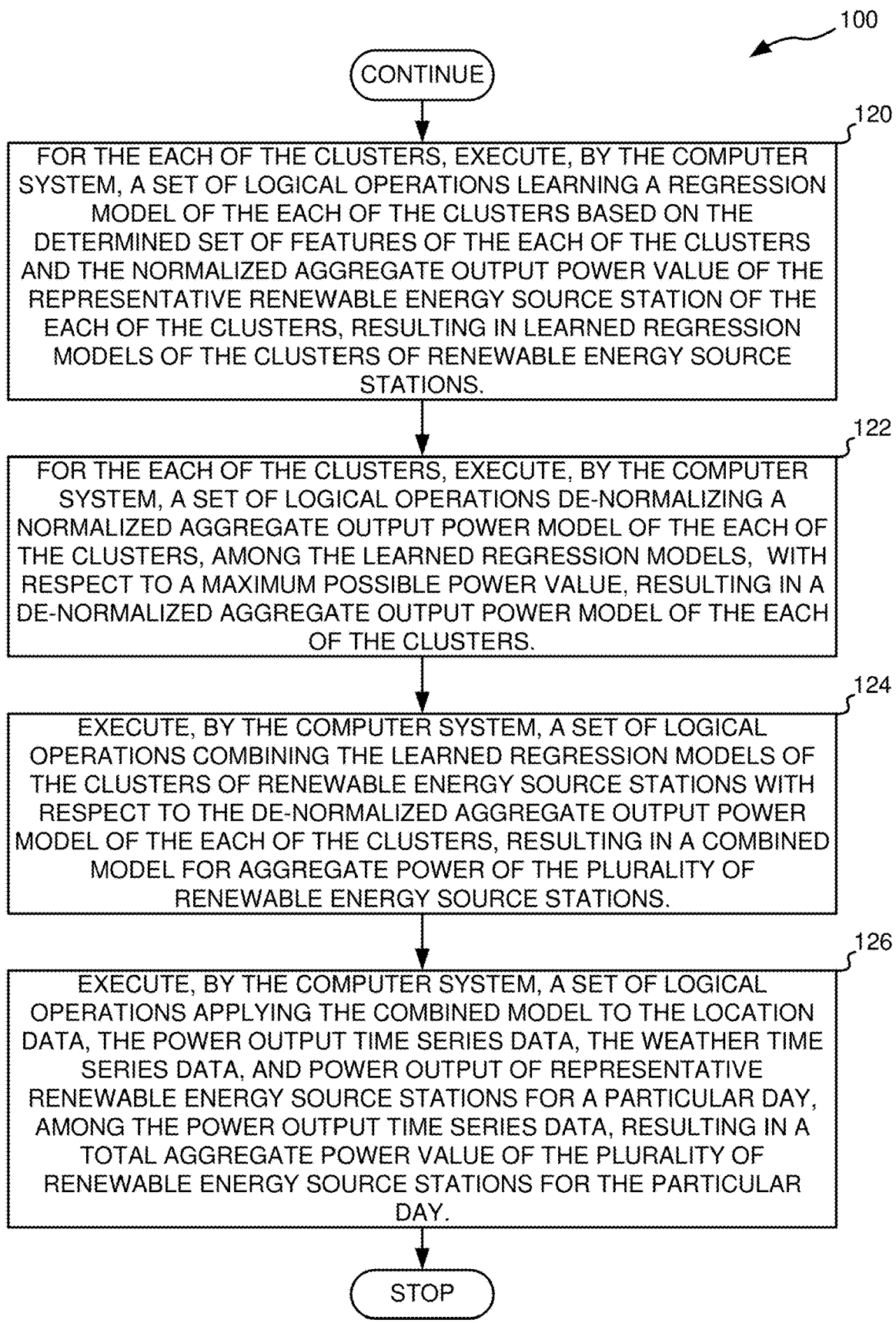
FIG. 1B depicts a flowchart in accordance with an exemplary embodiment of the present invention.

Referring to FIG. 1A and FIG. 1B, in an exemplary embodiment, the present invention is configured to perform an operation 110 of receiving, by a computer system, location data of a plurality of renewable energy source stations in a geographic region, power output time series data of each of the plurality of renewable energy source stations, weather time series data of weather parameters corresponding to the plurality of renewable energy source stations, and aggregate power output time series data for the geographic region, an operation 112 of clustering, by the computer system, the plurality of renewable energy source stations according to a clustering metric, resulting in clusters of renewable energy source stations, an operation 114 of for each of the clusters, designating, by the computer system, a renewable energy source station among the plurality of renewable energy source stations to be a representative renewable energy source station of the each of the clusters based on at least an aggregate power value among the aggregate power output time series data, an operation 116 of for the each of the clusters, determining, by the computer system, a set of features corresponding to the representative renewable energy source station of the each of the clusters, resulting in a determined set of features of the each of the clusters, an operation 118 of for the each of the clusters, executing, by the computer system, a set of logical operations normalizing the aggregate power value to the representative renewable energy source station of the each of the clusters with respect to a maximum of aggregate power values in the aggregate power output time series data (i.e., aggregate power value time series of the cluster), resulting in a normalized aggregate output power value of the representative renewable energy source station of the each of the clusters, an operation 120 of for the each of the clusters, executing, by the computer system, a set of logical operations learning a regression model of the each of the clusters based on the determined set of features of the each of the clusters and the normalized aggregate output power value of the representative renewable energy source station of the each of the clusters, resulting in learned regression models of the clusters of renewable energy source stations, an operation 122 of for the each of the clusters, executing, by the computer system, a set of logical operations de-normalizing a normalized aggregate output power model of the each of the clusters, among the learned regression models, with respect to a maximum possible power value, resulting in a de-normalized aggregate output power model of the each of the clusters, an operation 124 of executing, by the computer system, a set of logical operations combining the learned regression models of the clusters of renewable energy source stations with respect to the de-normalized aggregate output power model of the each of the clusters, resulting in a combined model for aggregate power of the plurality of renewable energy source stations, and an operation 126 of executing, by the computer system, a set of logical operations applying the combined model to the location data, the power output time series data, the weather time series data, and power output of representative renewable energy source stations for a particular day, among the power output time series data, resulting in a total aggregate power value of the plurality of renewable energy source stations for the particular day.

In an embodiment, the present invention models, using as few sampling points and parameters as possible, and estimates (i.e., upscales) the aggregate power output of renewable energy source stations installed over a wide area (e.g., a geographic area such as a state) accounting for the growth/change in the number of power generating stations over time and the large number of existing stations. In an embodiment, the present invention uses machine learning (ML) to determine the right models for estimating the aggregate power output of renewable energy/power source stations deployed over a wide area using as few parameters as possible. For example, the present invention uses parameters such as power output of one or more individual power stations, weather and irradiance parameters at appropriate locations, time of the day and year. Also, for example, the present invention estimates aggregate power even when the installed capacity changes dynamically.

In an embodiment, the present invention models and estimates (upscales) the aggregate power output of renewable energy source stations installed over a wide area for the following 3 scenarios: (1) scenario 1, where historic power output is known for all renewable energy source stations (e.g., PV stations) in a geographic area, where the present invention selects a few stations at which to sample output power (o/p) in the future for estimation; (2) scenario 2, where historic aggregate power output and geographic locations of all/some renewable energy source stations (e.g., PV stations) are known; and (3) scenario 3, where historic power output data for some renewable energy source stations (e.g., PV stations) and historic aggregate power output for the region are known. In an embodiment, the present invention determines aggregate power using regression, by mapping features of representative sites to the aggregate power using machine learning. In an embodiment, the present invention performs dynamic scaling (accommodating changes to installed renewable energy (e.g., PV) capacity including changes to the number of installed stations, by online/dynamic estimation of changes in the number of renewable energy source stations (sites)/total installed capacity. In an embodiment, the present invention determines the following: (a) k renewable energy source stations (e.g., PV sites); (b) a set of features (non-power) R at those sites or elsewhere or those that are site independent; and (c) a model $f(p_1, p_2, \ldots, p_k, R)$ such that $E[(f(p_{1t'}, p_{2t'}, \ldots, p_{kt'}) - P_{t'})2]$ is minimized over times $\hat{t}$ in the future, where $p_1, p_2, \ldots, p_k$ denote the power output at the k stations, and where $p_{1t'}, p_{2t'}, \ldots, p_{kt'}$ denote the power output at the k stations at time t'.

In an embodiment, the present invention models and estimates (upscales) the aggregate power output of renewable energy source stations (e.g., PV stations) installed over a wide area for scenario 1 by (1) performing regression analysis and (2) applying the results of the regression analysis to subsets of renewable energy source stations (e.g., PV stations). The present invention could use different models for different times of the year. In a particular embodiment, the present invention performs regression-based scaling as follows: (a) the present invention uses ML-based approaches (i) to select predictor renewable energy source stations (e.g., PV stations) and other features R (e.g., weather at the predictors, time of day), and (ii) to determine the mapping (can be linear or non-linear) from the predictor renewable energy source stations' power and other selected features to aggregate power; and (b) for a given regression model class F, the present invention (i) determines, for different k's, the k best renewable energy source stations (e.g., PV stations) and the best model $f(p_1, \ldots, p_k, R) \in F$ such that $(f(p_1, \ldots, p_k, R) - P_t)^2$ is minimized, and (ii) chooses the k that gives the least/reasonable error subject to an upper bound on k (and its associated renewable energy source station (e.g., PV station) set). In a particular embodiment, the present invention applies the results of the regression analysis to subsets of renewable energy source stations (e.g., PV stations) as follows: (a) the present invention clusters the renewable energy source stations (e.g., PV stations) using an appropriate metric (e.g., correlation in station power output, daily yield, max yield, correlation in weather parameters, yearly seasons), and (b) the present invention applies the results of the regression analysis to each cluster to determine the number of representative stations (RSs) and regression model for each cluster, where RSs need not be from within the cluster, where a single RS may be a good predictor for more than one cluster, and (i) assigns predictability scores for the renewable energy source stations (e.g., PV stations) during clustering and uses these scores to determine RSs, and (ii) calculates the total estimated power by $$f_1(p1, \ldots, pk_1, R_1)(+f_2(p1, \ldots, pk_2, R_2)+ \ldots +f_1(p1, \ldots, pk_c, R_c),$$

where c denotes the number of clusters and $k_i$, the number of representative stations in cluster I.

In an embodiment, the present invention models and estimates (upscales) the aggregate power output of renewable energy source stations (e.g., PV stations) installed over a wide area for scenarios 2 and 3 as follows: (1) when detailed power output is not available for the renewable energy source stations (e.g., PV stations), the present invention performs regression using weather parameters such as irradiance; and (2) the present invention maps the irradiance measured at a few representative renewable energy source stations (e.g., PV stations) to aggregate power output.

In an embodiment, the present invention models the aggregate power output of renewable energy source stations (e.g., PV stations) installed over a wide area in light of changes to installed capacity/changes in the number of renewable energy source stations (e.g., PV stations) over time, at a cluster level, by (1) performing regression to determine normalized aggregate power, normalized to maximum possible power/installed (as opposed to absolute power), (2) accounting for lower aggregate power due to weather, but when capacity actually increased, and (3) detecting changes to installed capacity, for each cluster individually. In a particular embodiment, the present invention performs regression to determine normalized aggregate power, normalized to maximum possible power/installed (as opposed to absolute power) as follows: (a) the present invention normalizes the aggregate power time series by dividing each $P_t$ by $P_{max,t}$, where (i) $P_{max,t}$ denotes the maximum possible power at time t, and (ii) $P_{max,0}$ denotes the maximum observed power (proxy for installed capacity) at time 0 (start time of regression), with the assumption that there is sufficient lead time before the start time of regression over which the max power at start time is obtained, and (b) the present invention estimates $P_{max,t}$ by tracking the maximum aggregate power output until that time. In a particular embodiment, the present invention accounts for lower aggregate power due to weather, but when capacity actually increased, by (a) using the weather at a few representative renewable energy source stations (e.g., PV stations) to scale the aggregate power to power on a clear-sky day, and (b) using the scaled power to drive the performing of the regression. In an embodiment, the present invention detects changes to installed capacity as follows: (a) the present invention receives solar irradiance yield data at a granularity of correlated cluster regions; (b) for each cluster, the present invention maps solar irradiance E to measured aggregate power (actual, that is not estimated) $P_{t,act}$ in a sliding window W (e.g., daily yield) with a coefficient c(t) at time t; (c) when capacity changes, the change in the regression coefficient exceeds a threshold $c_{th}$, that is $|c(t)-c(W)|>c_{th}$, the present invention resets $P_{max\_curr}=P_{t,act}$; and (d) the present invention could adapt steps (a), (b), and (c) to handle changes in capacity of representative stations.

In an embodiment, the present invention estimates the aggregate power output of renewable energy source stations (e.g., PV stations) installed over a wide area in light of changes to installed capacity/changes in the number of renewable energy source stations (e.g., PV stations) over time, at a cluster level, by (1) applying the model of the power output of renewable energy source stations (e.g., PV stations) and (2) accounting for change in installed capacity while scoring (i.e., applying the model), for each cluster individually. In a particular embodiment, the present invention accounts for change in installed capacity while scoring (i.e., applying the model) as follows: (a) the present invention sets $P_{max\_curr}=P_{max,reg\_end}$, where reg_end=the end of training period; (b) the present invention scales the output obtained after scoring the linear regression (LR) model by $P_{max\_curr}$ (in another embodiment, the present invention scales the output of the regression modeler by $P_{max\_curr}$); (c) the present invention updates $P_{max\_curr}$ if $P_{t,act}>P_{max\_curr}$; and (d) when the present invention detects significant deviation to $P_{max}$ (e.g., by methods such as cumulative sum control chart (CUSUM), the present invention initiates relearning. In a specific embodiment, the present invention updates $P_{max\_curr}$ if $P_{t,act}>P_{max\_curr}$ as follows: (i) when $P_{t,act}$ is known, the present invention uses the irradiance values at t to scale it to power on a clear-sky day; and (ii) if $P_{t,act}^{scaled}$ is significantly higher than $P_{max\_curr}$ then the present invention updates $P_{max\_curr}$.

In an embodiment, the present invention provides a system and method for learning and scoring an appropriate regression model (linear or non-linear) for estimating an aggregate metric/parameter of a population distributed over a wide area, where the population increases or decreases over time, using one or more historic data such as time series of the metric/parameter of the independent entities in the population, time series of a correlated or a determinant parameter recorded for the independent entities and other parameters such as time of the year and day, and using such parameters measured/estimated at a few sample entities at times for which aggregate metric is to be estimated. In a particular embodiment, the present invention provides a system and method for learning and scoring an appropriate regression model (linear or non-linear) for the aggregate output power expected from a wide-area installation of a renewable energy source, such as solar energy and wind power, whose installed capacity is increasing over time, using one or more historic data such as output power time series, weather time series recorded at the power stations and other parameters such as time of the year and day, and using such parameters measured/estimated at a few representative stations at times for which aggregate power output is to be estimated. For example, the present invention could cluster stations using an appropriate distance metric and could choose an optimal number of predictor stations for each cluster using appropriate measures. In a specific example, the predictor stations of a cluster are not confined to the cluster.

In a particular embodiment, the present invention normalizes the aggregate power of each cluster by using the maximum aggregate power possible at time t. For example, the present invention could determine the maximum possible aggregate power from the actual observed values of aggregate power. In a further example, the present invention could determine the maximum possible aggregate power by using irradiance and the current maximum power. In a specific embodiment, the present invention extracts needed features for each timestamp for each cluster.

In an embodiment, the present invention determines the aggregate power output from a few representative renewable energy source stations. In a particular embodiment, the present invention determines which stations to choose as representatives for maximum accuracy. For example, the present invention could cluster the stations using parameters such as location and weather and could choose representatives for the clusters (not necessarily all from the cluster). In a particular embodiment, the present invention normalizes the aggregate power before deriving a model to handle dynamic changes, at a cluster level. For example, the present invention could detect change to installed capacity, at a cluster level, using solar irradiance and aggregate power so that the normalization factor could be changed while handling dynamicity. In an embodiment, the present invention provides a method to estimate aggregate regional renewable energy source (e.g., solar energy) forecast using measurements from a sample set of distributed renewable energy source generation stations (e.g., PV stations), and handles dynamic changes to installed capacity, at a cluster level.

In an embodiment, present invention uses regression to estimate the aggregate power from a set of renewable energy source stations (e.g., photo-voltaic (PV) stations) using only a few representative stations. In a particular embodiment, the present invention estimates the aggregate power for every time point, by using only the values at a few representative stations. For example, the present invention could select representative entities (i.e., renewable energy source stations) by clustering all of the entities. In a specific example, the present invention uses regression to estimate an aggregate value from a few representative sources contributing to the aggregate and to estimate an aggregate value from a few sources, such as solar PV, dynamically to the aggregate.

In an embodiment, the present invention provides a method and system for selecting an appropriate regression model (linear or non-linear) using machine learning (ML) approaches, for accurately upscaling aggregate renewable energy/power (Photo voltaic/Solar) output in wide-area installations of renewable energy (e.g., PV) sources. In a particular embodiment, the present invention learns and scores a regression model, by (1) using one or more historic data such as time series of the power of the independent entities, time series of a correlated/determinant parameter recorded for the independent entities, and parameters such as time of the year and day and (2) utilizing the parameters measured/estimated at a few sample entities at times for which aggregate metric is to be estimated. For example, the present invention could create one or more clusters of renewable energy source stations (e.g., PV stations) using an appropriate distance metric, and selects an optimal number of predictor representative) stations for each cluster using appropriate measures. In another example, the present invention could normalize the aggregate power of each cluster, extracting required features for each timestamp for each cluster and determining maximum possible aggregate power from the actual observed values (irradiance and current maximum power).

Figure 4:
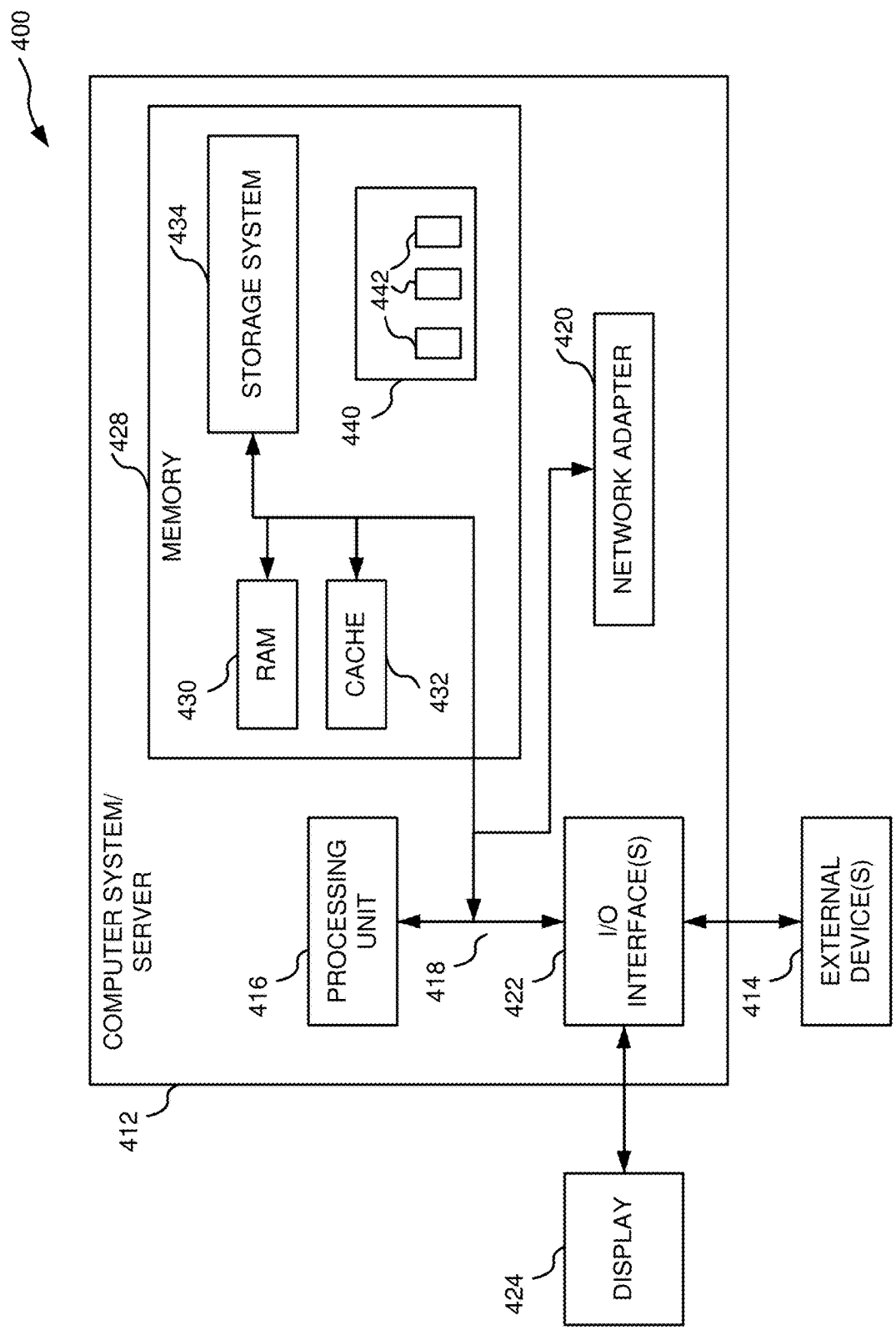
FIG. 4 depicts a computer system in accordance with an exemplary embodiment of the present invention.

In an exemplary embodiment, the computer system is a standalone computer system, such as computer system 400 shown in FIG. 4, a network of distributed computers, where at least some of the computers are computer systems such as computer system 400 shown in FIG. 4, or a cloud computing node server, such as computer system 400 shown in FIG. 4. In an embodiment, the computer system is a computer system 400 as shown in FIG. 4, that executes a modeling and calculating aggregate power of a set of renewable energy source stations using power output from representative renewable energy source stations script or computer software application that carries out the operations of at least method 100. In an embodiment, the computer system is a computer system/server 412 as shown in FIG. 4, that executes a modeling and calculating aggregate power of a set of renewable energy source stations using power output from representative renewable energy source stations script or computer software application that carries out the operations of at least method 100. In an embodiment, the computer system is a processing unit 416 as shown in FIG. 4, that executes a modeling and calculating aggregate power of a set of renewable energy source stations using power output from representative renewable energy source stations script or computer software application that carries out the operations of at least method 100. In an embodiment, the computer system is a computer system 400 as shown in FIG. 4, that executes a modeling and calculating aggregate power of a set of renewable energy source stations using power output from representative renewable energy source stations script or computer software application that carries out at least operations 110, 112, 114, 116, 118, 120, 122, 124, and 126. In an embodiment, the computer system is a computer system/server 412 as shown in FIG. 4, that executes a modeling and calculating aggregate power of a set of renewable energy source stations using power output from representative renewable energy source stations script or computer software application that carries out at least operations 110, 112, 114, 116, 118, 120, 122, 124, and 126. In an embodiment, the computer system is a processing unit 416 as shown in FIG. 4, that executes a modeling and calculating aggregate power of a set of renewable energy source stations using power output from representative renewable energy source stations script or computer software application that carries out at least operations 110, 112, 114, 116, 118, 120, 122, 124, and 126.

In an embodiment, the computer system is a machine learning computer software/program/algorithm that executes a modeling and calculating aggregate power of a set of renewable energy source stations using power output from representative renewable energy source stations script or computer software application that carries out the operations of at least method 100. In an embodiment, the computer system is a machine learning computer software/program/algorithm that executes a modeling and calculating aggregate power of a set of renewable energy source stations using power output from representative renewable energy source stations script or computer software application that carries out at least operations 110, 112, 114, 116, 118, 120, 122, 124, and 126. In an embodiment, the computer system is a robot that executes a modeling and calculating aggregate power of a set of renewable energy source stations using power output from representative renewable energy source stations script or computer software application that carries out the operations of at least method 100.

In an embodiment, the computer system is a cognitive computing platform that executes a modeling and calculating aggregate power of a set of renewable energy source stations using power output from representative renewable energy source stations script or computer software application that carries out the operations of at least method 100. In an embodiment, the computer system is a cognitive computing platform that executes a modeling and calculating aggregate power of a set of renewable energy source stations using power output from representative renewable energy source stations script or computer software application that carries out at least operations 110, 112, 114, 116, 118, 120, 122, 124, and 126. In an embodiment, the computer system is an artificial intelligence that executes a modeling and calculating aggregate power of a set of renewable energy source stations using power output from representative renewable energy source stations script or computer software application that carries out the operations of at least method 100. In an embodiment, the computer system is an artificial intelligence that executes a modeling and calculating aggregate power of a set of renewable energy source stations using power output from representative renewable energy source stations script or computer software application that carries out at least operations 110, 112, 114, 116, 118, 120, 122, 124, and 126.

Figure 1C:
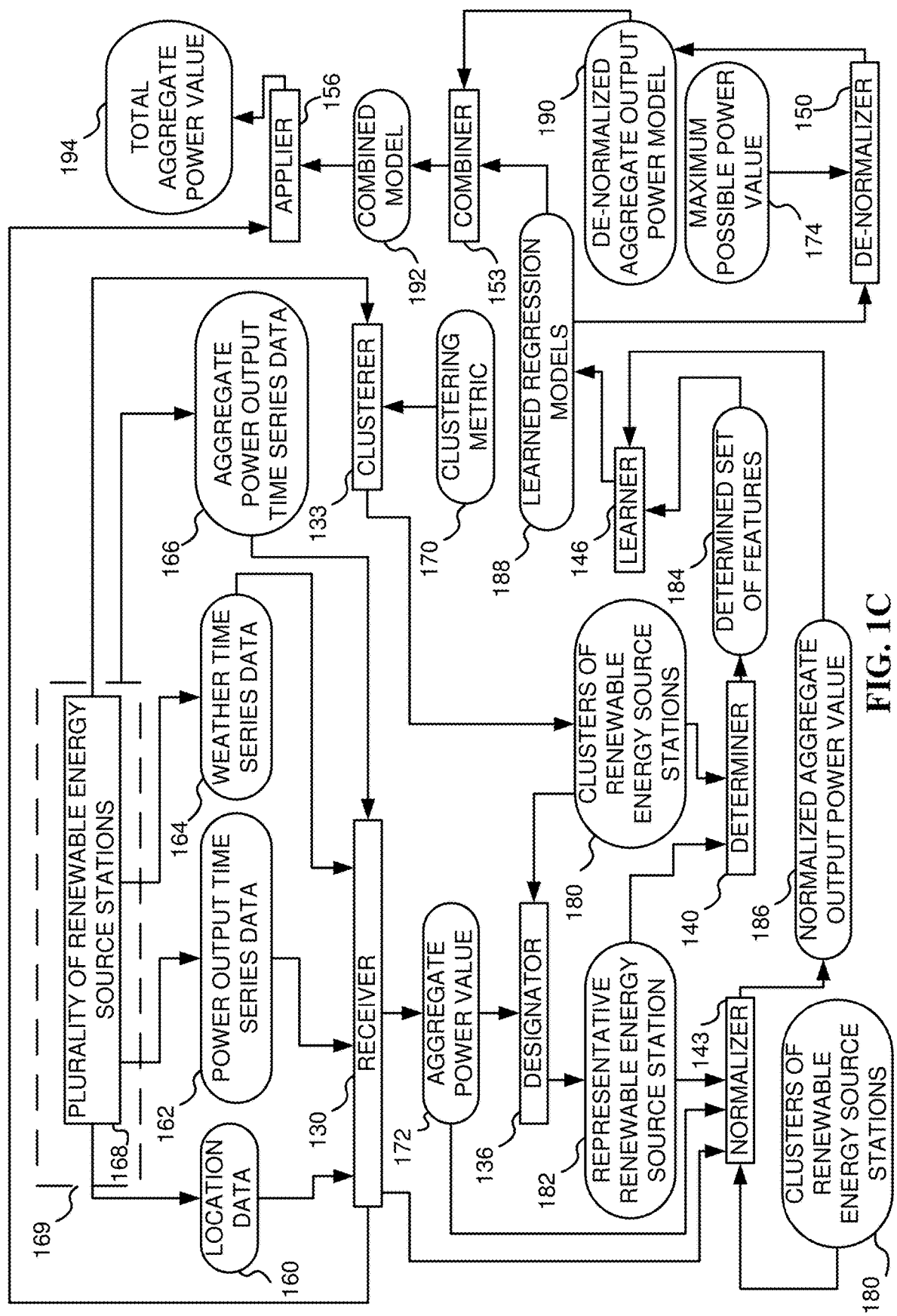
FIG. 1C depicts a block diagram in accordance with an exemplary embodiment of the present invention.

Referring to FIG. 1C, in an exemplary embodiment, the present invention includes a receiver 130, a clusterer 133, a designator 136, a determiner 140, a normalizer 143, a learner 146, a de-normalizer 150, a combiner 153, and an applier 156. In an embodiment, receiver 130 is configured to receive location data 160 of a plurality of renewable energy source stations 168 in a geographic region 169, power output time series data 162 of each of plurality of renewable energy source stations 168, weather time series data 164 of weather parameters corresponding to plurality of renewable energy source stations 168, and aggregate power output time series data 166 for geographic region 169. In an embodiment, receiver 130 includes a computer system, such as computer system 400 as shown in FIG. 4, performing operation 110. In an embodiment, receiver 130 includes a computer system, such as computer system/server 412 as shown in FIG. 4, performing operation 110. In an embodiment, receiver 130 includes a computer system, such as processing unit 416 as shown in FIG. 4, performing operation 110. In an embodiment, receiver 130 is implemented as computer software executing on a computer system, such as computer system 400 as shown in FIG. 4 such that the computer system performs operation 110. In an embodiment, receiver 130 is implemented as computer software executing on a computer system, such as computer system/server 412 as shown in FIG. 4, such that the computer system performs operation 110. In an embodiment, receiver 130 is implemented as computer software executing on a computer system, such as processing unit 416 as shown in FIG. 4 such that the computer system performs operation 110. In an embodiment, receiver 130 performs operation 110 as computer software executing on a processor of receiver 130. In an embodiment, receiver 130 includes a computer system, such as a machine learning computer software/program/algorithm performing operation 110. In an embodiment, receiver 130 includes a computer system, such as a cognitive computing platform performing operation 110. In an embodiment, receiver 130 includes a computer system, such as an artificial intelligence performing operation 110.

In an embodiment, clusterer 133 is configured to cluster plurality of renewable energy source stations 168 according to a clustering metric 170, resulting in clusters of renewable energy source stations 180. In an embodiment, clusterer 133 includes a computer system, such as computer system 400 as shown in FIG. 4, performing operation 112. In an embodiment, clusterer 133 includes a computer system, such as computer system/server 412 as shown in FIG. 4, performing operation 112. In an embodiment, clusterer 133 includes a computer system, such as processing unit 416 as shown in FIG. 4, performing operation 112. In an embodiment, clusterer 133 is implemented as computer software executing on a computer system, such as computer system 400 as shown in FIG. 4 such that the computer system performs operation 112. In an embodiment, clusterer 133 is implemented as computer software executing on a computer system, such as computer system/server 412 as shown in FIG. 4, such that the computer system performs operation 112. In an embodiment, clusterer 133 is implemented as computer software executing on a computer system, such as processing unit 416 as shown in FIG. 4 such that the computer system performs operation 112. In an embodiment, clusterer 133 performs operation 112 as computer software executing on a processor of clusterer 133. In an embodiment, clusterer 133 includes a computer system, such as a machine learning computer software/program/algorithm performing operation 112. In an embodiment, clusterer 133 includes a computer system, such as a cognitive computing platform performing operation 112. In an embodiment, clusterer 133 includes a computer system, such as an artificial intelligence performing operation 112.

In an embodiment, designator 136 is configured to designate, for each of clusters 180, a renewable energy source station among plurality of renewable energy source stations 168 to be a representative renewable energy source station 182 of each of clusters 180 based on at least an aggregate power value 172 among aggregate power output time series data 166. In an embodiment, designator 136 includes a computer system, such as computer system 400 as shown in FIG. 4, performing operation 114. In an embodiment, designator 136 includes a computer system, such as computer system/server 412 as shown in FIG. 4, performing operation 114. In an embodiment, designator 136 includes a computer system, such as processing unit 416 as shown in FIG. 4, performing operation 114. In an embodiment, designator 136 is implemented as computer software executing on a computer system, such as computer system 400 as shown in FIG. 4 such that the computer system performs operation 114. In an embodiment, designator 136 is implemented as computer software executing on a computer system, such as computer system/server 412 as shown in FIG. 4, such that the computer system performs operation 114. In an embodiment, designator 136 is implemented as computer software executing on a computer system, such as processing unit 416 as shown in FIG. 4 such that the computer system performs operation 114. In an embodiment, designator 136 performs operation 114 as computer software executing on a processor of designator 136. In an embodiment, designator 136 includes a computer system, such as a machine learning computer software/program/algorithm performing operation 114. In an embodiment, designator 136 includes a computer system, such as a cognitive computing platform performing operation 114. In an embodiment, designator 136 includes a computer system, such as an artificial intelligence performing operation 114.

In an embodiment, determiner 140 is configured to determine, for each of clusters 180, a set of features corresponding to representative renewable energy source station 182 of each of clusters 180, resulting in a determined set of features 184 of each of clusters 180. In an embodiment, determiner 140 includes a computer system, such as computer system 400 as shown in FIG. 4, performing operation 116. In an embodiment, determiner 140 includes a computer system, such as computer system/server 412 as shown in FIG. 4, performing operation 116. In an embodiment, determiner 140 includes a computer system, such as processing unit 416 as shown in FIG. 4, performing operation 116. In an embodiment, determiner 140 is implemented as computer software executing on a computer system, such as computer system 400 as shown in FIG. 4 such that the computer system performs operation 116. In an embodiment, determiner 140 is implemented as computer software executing on a computer system, such as computer system/server 412 as shown in FIG. 4, such that the computer system performs operation 116. In an embodiment, determiner 140 is implemented as computer software executing on a computer system, such as processing unit 416 as shown in FIG. 4 such that the computer system performs operation 116. In an embodiment, determiner 140 performs operation 116 as computer software executing on a processor of determiner 140. In an embodiment, determiner 140 includes a computer system, such as a machine learning computer software/program/algorithm performing operation 116. In an embodiment, determiner 140 includes a computer system, such as a cognitive computing platform performing operation 116. In an embodiment, determiner 140 includes a computer system, such as an artificial intelligence performing operation 116.

In an embodiment, normalizer 143 is configured to execute, for each of clusters 180, a set of logical operations normalizing aggregate power value 172 to representative renewable energy source station 182 of each of clusters 180 with respect to a maximum of aggregate power values in aggregate power output time series data 166 (i.e., aggregate power value time series of the cluster), resulting in a normalized aggregate output power value 186 of representative renewable energy source station 182 of each of clusters 180. In an embodiment, normalizer 143 includes a computer system, such as computer system 400 as shown in FIG. 4, performing operation 118. In an embodiment, normalizer 143 includes a computer system, such as computer system/server 412 as shown in FIG. 4, performing operation 118. In an embodiment, normalizer 143 includes a computer system, such as processing unit 416 as shown in FIG. 4, performing operation 118. In an embodiment, normalizer 143 is implemented as computer software executing on a computer system, such as computer system 400 as shown in FIG. 4 such that the computer system performs operation 118. In an embodiment, normalizer 143 is implemented as computer software executing on a computer system, such as computer system/server 412 as shown in FIG. 4, such that the computer system performs operation 118. In an embodiment, normalizer 143 is implemented as computer software executing on a computer system, such as processing unit 416 as shown in FIG. 4 such that the computer system performs operation 118. In an embodiment, normalizer 143 performs operation 118 as computer software executing on a processor of normalizer 143. In an embodiment, normalizer 143 includes a computer system, such as a machine learning computer software/program/algorithm performing operation 118. In an embodiment, normalizer 143 includes a computer system, such as a cognitive computing platform performing operation 118. In an embodiment, normalizer 143 includes a computer system, such as an artificial intelligence performing operation 118.

In an embodiment, learner 146 is configured to execute, for each of clusters 180, a set of logical operations learning a regression model of each of clusters 180 based on determined set of features 184 of each of clusters 180 and normalized aggregate output power value 186 of representative renewable energy source station 182 of each of clusters 180, resulting in learned regression models 188 of clusters of renewable energy source stations 180. In an embodiment, learner 146 includes a computer system, such as computer system 400 as shown in FIG. 4, performing operation 120. In an embodiment, learner 146 includes a computer system, such as computer system/server 412 as shown in FIG. 4, performing operation 120. In an embodiment, learner 146 includes a computer system, such as processing unit 416 as shown in FIG. 4, performing operation 120. In an embodiment, learner 146 is implemented as computer software executing on a computer system, such as computer system 400 as shown in FIG. 4 such that the computer system performs operation 120. In an embodiment, learner 146 is implemented as computer software executing on a computer system, such as computer system/server 412 as shown in FIG. 4, such that the computer system performs operation 120. In an embodiment, learner 146 is implemented as computer software executing on a computer system, such as processing unit 416 as shown in FIG. 4 such that the computer system performs operation 120. In an embodiment, learner 146 performs operation 120 as computer software executing on a processor of learner 146. In an embodiment, learner 146 includes a computer system, such as a machine learning computer software/program/algorithm performing operation 120. In an embodiment, learner 146 includes a computer system, such as a cognitive computing platform performing operation 120. In an embodiment, learner 146 includes a computer system, such as an artificial intelligence performing operation 120.

In an embodiment, de-normalizer 150 is configured to execute, for each of clusters 180, a set of logical operations de-normalizing a normalized aggregate output power model of each of clusters 180, among learned regression models 188, with respect to a maximum possible power value 174, resulting in a de-normalized aggregate output power model 190 of each of clusters 180. In an embodiment, de-normalizer 150 includes a computer system, such as computer system 400 as shown in FIG. 4, performing operation 122. In an embodiment, de-normalizer 150 includes a computer system, such as computer system/server 412 as shown in FIG. 4, performing operation 122. In an embodiment, de-normalizer 150 includes a computer system, such as processing unit 416 as shown in FIG. 4, performing operation 122. In an embodiment, de-normalizer 150 is implemented as computer software executing on a computer system, such as computer system 400 as shown in FIG. 4 such that the computer system performs operation 122. In an embodiment, de-normalizer 150 is implemented as computer software executing on a computer system, such as computer system/server 412 as shown in FIG. 4, such that the computer system performs operation 122. In an embodiment, de-normalizer 150 is implemented as computer software executing on a computer system, such as processing unit 416 as shown in FIG. 4 such that the computer system performs operation 122. In an embodiment, de-normalizer 150 performs operation 122 as computer software executing on a processor of de-normalizer 150. In an embodiment, de-normalizer 150 includes a computer system, such as a machine learning computer software/program/algorithm performing operation 122. In an embodiment, de-normalizer 150 includes a computer system, such as a cognitive computing platform performing operation 122. In an embodiment, de-normalizer 150 includes a computer system, such as an artificial intelligence performing operation 122.

In an embodiment, combiner 153 is configured to execute a set of logical operations combining learned regression models 188 of clusters of renewable energy source stations 180 with respect to de-normalized aggregate output power model 190 of each of clusters 180, resulting in a combined model 192 for aggregate power of plurality of renewable energy source stations 168. In an embodiment, combiner 153 includes a computer system, such as computer system 400 as shown in FIG. 4, performing operation 124. In an embodiment, combiner 153 includes a computer system, such as computer system/server 412 as shown in FIG. 4, performing operation 124. In an embodiment, combiner 153 includes a computer system, such as processing unit 416 as shown in FIG. 4, performing operation 124. In an embodiment, combiner 153 is implemented as computer software executing on a computer system, such as computer system 400 as shown in FIG. 4 such that the computer system performs operation 124. In an embodiment, combiner 153 is implemented as computer software executing on a computer system, such as computer system/server 412 as shown in FIG. 4, such that the computer system performs operation 124. In an embodiment, combiner 153 is implemented as computer software executing on a computer system, such as processing unit 416 as shown in FIG. 4 such that the computer system performs operation 124. In an embodiment, combiner 153 performs operation 124 as computer software executing on a processor of combiner 153. In an embodiment, combiner 153 includes a computer system, such as a machine learning computer software/program/ algorithm performing operation 124. In an embodiment, combiner 153 includes a computer system, such as a cognitive computing platform performing operation 124. In an embodiment, combiner 153 includes a computer system, such as an artificial intelligence performing operation 124.

In an embodiment, applier 156 is configured to execute a set of logical operations applying combined model 192 to location data 160, power output time series data 162, weather time series data 164, and power output of representative renewable energy source stations 182 for a particular day, among power output time series data 162, resulting in a total aggregate power value 194 of plurality of renewable energy source stations 168 for the particular day. In an embodiment, applier 156 includes a computer system, such as computer system 400 as shown in FIG. 4, performing operation 126. In an embodiment, applier 156 includes a computer system, such as computer system/server 412 as shown in FIG. 4, performing operation 126. In an embodiment, applier 156 includes a computer system, such as processing unit 416 as shown in FIG. 4, performing operation 126. In an embodiment, applier 156 is implemented as computer software executing on a computer system, such as computer system 400 as shown in FIG. 4 such that the computer system performs operation 126. In an embodiment, applier 156 is implemented as computer software executing on a computer system, such as computer system/ server 412 as shown in FIG. 4, such that the computer system performs operation 126. In an embodiment, applier 156 is implemented as computer software executing on a computer system, such as processing unit 416 as shown in FIG. 4 such that the computer system performs operation 126. In an embodiment, applier 156 performs operation 126 as computer software executing on a processor of applier 156. In an embodiment, applier 156 includes a computer system, such as a machine learning computer software/ program/algorithm performing operation 126. In an embodiment, applier 156 includes a computer system, such as a cognitive computing platform performing operation 126. In an embodiment, applier 156 includes a computer system, such as an artificial intelligence performing operation 126.

Clustering Renewable Energy Source Stations

In an exemplary embodiment, the clustering includes choosing the clustering metric based on the location data, the power output time series data, and the weather time series data. In an exemplary embodiment, clustering operation 112 includes an operation of choosing the clustering metric based on the location data, the power output time series data, and the weather time series data. In an embodiment, clusterer 133 is configured to choose clustering metric 170 based on location data 160, power output time series data 162, and weather time series data 164. In an embodiment, clusterer 133 includes a computer system, such as computer system 400 as shown in FIG. 4, choosing clustering metric 170 based on location data 160, power output time series data 162, and weather time series data 164. In an embodiment, clusterer 133 includes a computer system, such as computer system/server 412 as shown in FIG. 4, choosing clustering metric 170 based on location data 160, power output time series data 162, and weather time series data 164. In an embodiment, clusterer 133 includes a computer system, such as processing unit 416 as shown in FIG. 4, choosing clustering metric 170 based on location data 160, power output time series data 162, and weather time series data 164.

In an embodiment, clusterer 133 is implemented as computer software executing on a computer system, such as computer system 400 as shown in FIG. 4, such that the computer system chooses clustering metric 170 based on location data 160, power output time series data 162, and weather time series data 164. In an embodiment, clusterer 133 is implemented as computer software executing on a computer system, such as computer system/server 412 as shown in FIG. 4, such that the computer system chooses clustering metric 170 based on location data 160, power output time series data 162, and weather time series data 164. In an embodiment, clusterer 133 is implemented as computer software executing on a computer system, such as processing unit 416 as shown in FIG. 4 such that the computer system chooses clustering metric 170 based on location data 160, power output time series data 162, and weather time series data 164. In an embodiment, clusterer 133 chooses clustering metric 170 based on location data 160, power output time series data 162, and weather time series data 164 as computer software executing on a processor/processing unit of clusterer 133.

In an embodiment, clusterer 133 is a machine learning computer software/program/algorithm choosing clustering metric 170 based on location data 160, power output time series data 162, and weather time series data 164. In an embodiment, clusterer 133 is a cognitive computing platform choosing clustering metric 170 based on location data 160, power output time series data 162, and weather time series data 164. In an embodiment, clusterer 133 is an artificial intelligence choosing clustering metric 170 based on location data 160, power output time series data 162, and weather time series data 164.

Designating Representative Renewable Energy Source Stations

In an exemplary embodiment, the designating includes designating the representative renewable energy source station based on representative metrics including at least a center of the each of the clusters and a correlation value indicating a correlation of the renewable energy source station to the aggregate power value. In an exemplary embodiment, designating operation 114 includes an operation of designating the representative renewable energy source station based on representative metrics including at least a center of the each of the clusters and a correlation value indicating a correlation of the renewable energy source station to the aggregate power value. In an embodiment, designator 136 is configured to designate representative renewable energy source station 182 based on representative metrics including at least a center of each of clusters 180 and a correlation value indicating a correlation of the renewable energy source station to aggregate power value 172. In an embodiment, designator 136 includes a computer system, such as computer system 400 as shown in FIG. 4, designating representative renewable energy source station 182 based on representative metrics including at least a center of each of clusters 180 and a correlation value indicating a correlation of the renewable energy source station to aggregate power value 172. In an embodiment, designator 136 includes a computer system, such as computer system/server 412 as shown in FIG. 4, designating representative renewable energy source station 182 based on representative metrics including at least a center of each of clusters 180 and a correlation value indicating a correlation of the renewable energy source station to aggregate power value 172. In an embodiment, designator 136 includes a computer system, such as processing unit 416 as shown in FIG. 4, designating representative renewable energy source station 182 based on representative metrics including at least a center of each of clusters 180 and a correlation value indicating a correlation of the renewable energy source station to aggregate power value 172.

In an embodiment, designator 136 is implemented as computer software executing on a computer system, such as computer system 400 as shown in FIG. 4, such that the computer system designates representative renewable energy source station 182 based on representative metrics including at least a center of each of clusters 180 and a correlation value indicating a correlation of the renewable energy source station to aggregate power value 172. In an embodiment, designator 136 is implemented as computer software executing on a computer system, such as computer system/server 412 as shown in FIG. 4, such that the computer system designates representative renewable energy source station 182 based on representative metrics including at least a center of each of clusters 180 and a correlation value indicating a correlation of the renewable energy source station to aggregate power value 172. In an embodiment, designator 136 is implemented as computer software executing on a computer system, such as processing unit 416 as shown in FIG. 4 such that the computer system designates representative renewable energy source station 182 based on representative metrics including at least a center of each of clusters 180 and a correlation value indicating a correlation of the renewable energy source station to aggregate power value 172. In an embodiment, designator 136 designates representative renewable energy source station 182 based on representative metrics including at least a center of each of clusters 180 and a correlation value indicating a correlation of the renewable energy source station to aggregate power value 172 as computer software executing on a processor/processing unit of designator 136.

In an embodiment, designator 136 is a machine learning computer software/program/algorithm designating representative renewable energy source station 182 based on representative metrics including at least a center of each of clusters 180 and a correlation value indicating a correlation of the renewable energy source station to aggregate power value 172. In an embodiment, designator 136 is a cognitive computing platform designating representative renewable energy source station 182 based on representative metrics including at least a center of each of clusters 180 and a correlation value indicating a correlation of the renewable energy source station to aggregate power value 172. In an embodiment, designator 136 is an artificial intelligence designating representative renewable energy source station 182 based on representative metrics including at least a center of each of clusters 180 and a correlation value indicating a correlation of the renewable energy source station to aggregate power value 172.

Normalizing Aggregate Power Value

In an exemplary embodiment, the normalizing includes calculating, by the computer system, a mapping from a power output value, among the power output time series data, of the representative renewable energy source station of the each of the clusters and the determined set of features of the each of the clusters, to the aggregate power value. In an exemplary embodiment, normalizing operation 118 includes an operation of calculating, by the computer system, a mapping from a power output value, among the power output time series data, of the representative renewable energy source station of the each of the clusters and the determined set of features of the each of the clusters, to the aggregate power value. In an embodiment, normalizer 143 is configured to calculate a mapping from a power output value, among power output time series data 162, of representative renewable energy source station 182 of each of clusters 180 and determined set of features 184 of each of clusters 180, to aggregate power value 172. In an embodiment, normalizer 143 includes a computer system, such as computer system 400 as shown in FIG. 4, calculating a mapping from a power output value, among power output time series data 162, of representative renewable energy source station 182 of each of clusters 180 and determined set of features 184 of each of clusters 180, to aggregate power value 172. In an embodiment, normalizer 143 includes a computer system, such as computer system/server 412 as shown in FIG. 4, calculating a mapping from a power output value, among power output time series data 162, of representative renewable energy source station 182 of each of clusters 180 and determined set of features 184 of each of clusters 180, to aggregate power value 172. In an embodiment, normalizer 143 includes a computer system, such as processing unit 416 as shown in FIG. 4, calculating a mapping from a power output value, among power output time series data 162, of representative renewable energy source station 182 of each of clusters 180 and determined set of features 184 of each of clusters 180, to aggregate power value 172.

In an embodiment, normalizer 143 is implemented as computer software executing on a computer system, such as computer system 400 as shown in FIG. 4, such that the computer system calculates a mapping from a power output value, among power output time series data 162, of representative renewable energy source station 182 of each of clusters 180 and determined set of features 184 of each of clusters 180, to aggregate power value 172. In an embodiment, normalizer 143 is implemented as computer software executing on a computer system, such as computer system/server 412 as shown in FIG. 4, such that the computer system calculates a mapping from a power output value, among power output time series data 162, of representative renewable energy source station 182 of each of clusters 180 and determined set of features 184 of each of clusters 180, to aggregate power value 172. In an embodiment, normalizer 143 is implemented as computer software executing on a computer system, such as processing unit 416 as shown in FIG. 4 such that the computer system calculates a mapping from a power output value, among power output time series data 162, of representative renewable energy source station 182 of each of clusters 180 and determined set of features 184 of each of clusters 180, to aggregate power value 172. In an embodiment, normalizer 143 calculates a mapping from a power output value, among power output time series data 162, of representative renewable energy source station 182 of each of clusters 180 and determined set of features 184 of each of clusters 180, to aggregate power value 172 as computer software executing on a processor/processing unit of normalizer 143.

In an embodiment, normalizer 143 is a machine learning computer software/program/algorithm calculating a mapping from a power output value, among power output time series data 162, of representative renewable energy source station 182 of each of clusters 180 and determined set of features 184 of each of clusters 180, to aggregate power value 172. In an embodiment, normalizer 143 is a cognitive computing platform calculating a mapping from a power output value, among power output time series data 162, of representative renewable energy source station 182 of each of clusters 180 and determined set of features 184 of each of clusters 180, to aggregate power value 172. In an embodiment, normalizer 143 is an artificial intelligence calculating a mapping from a power output value, among power output time series data 162, of representative renewable energy source station 182 of each of clusters 180 and determined set of features 184 of each of clusters 180, to aggregate power value 172.

Normalizing to Maximum Possible Power

In a particular embodiment, the normalizing includes executing, by the computer system, a set of logical operations normalizing the aggregate power value to the maximum possible power value. In a particular embodiment, normalizing operation 118 includes an operation of executing, by the computer system, a set of logical operations normalizing the aggregate power value to the maximum possible power value. In an embodiment, normalizer 143 is configured to execute a set of logical operations normalizing aggregate power value 172 to maximum possible power value 174. In an embodiment, normalizer 143 includes a computer system, such as computer system 400 as shown in FIG. 4, executing a set of logical operations normalizing aggregate power value 172 to maximum possible power value 174. In an embodiment, normalizer 143 includes a computer system, such as computer system/server 412 as shown in FIG. 4, executing a set of logical operations normalizing aggregate power value 172 to maximum possible power value 174. In an embodiment, normalizer 143 includes a computer system, such as processing unit 416 as shown in FIG. 4, executing a set of logical operations normalizing aggregate power value 172 to maximum possible power value 174.

In an embodiment, normalizer 143 is implemented as computer software executing on a computer system, such as computer system 400 as shown in FIG. 4, such that the computer system executes a set of logical operations normalizing aggregate power value 172 to maximum possible power value 174. In an embodiment, normalizer 143 is implemented as computer software executing on a computer system, such as computer system/server 412 as shown in FIG. 4, such that the computer system executes a set of logical operations normalizing aggregate power value 172 to maximum possible power value 174. In an embodiment, normalizer 143 is implemented as computer software executing on a computer system, such as processing unit 416 as shown in FIG. 4 such that the computer system executes a set of logical operations normalizing aggregate power value 172 to maximum possible power value 174. In an embodiment, normalizer 143 executes a set of logical operations normalizing aggregate power value 172 to maximum possible power value 174 as computer software executing on a processor/processing unit of normalizer 143.

In an embodiment, normalizer 143 is a machine learning computer software/program/algorithm executing a set of logical operations normalizing aggregate power value 172 to maximum possible power value 174. In an embodiment, normalizer 143 is a cognitive computing platform executing a set of logical operations normalizing aggregate power value 172 to maximum possible power value 174. In an embodiment, normalizer 143 is an artificial intelligence executing a set of logical operations normalizing aggregate power value 172 to maximum possible power value 174.

Dividing Power Values

In a particular embodiment, the normalizing the aggregate power value to the maximum possible power value includes executing, by the computer system, a set of logical operations normalizing the aggregate power output time series data by dividing each power value $P_t$, among the aggregate power output time series data, at time t, by the maximum possible power value, $P_{max,t}$, at time t. In a particular embodiment, normalizing the aggregate power value to the maximum possible power value operation includes an operation executing, by the computer system, a set of logical operations normalizing the aggregate power output time series data by dividing each power value $P_t$, among the aggregate power output time series data, at time t, by the maximum possible power value, $P_{max,t}$, at time t. In an embodiment, normalizer 143 is configured to execute a set of logical operations normalizing aggregate power output time series data 166 by dividing each power value $P_t$, among aggregate power output time series data 166, at time t, by maximum possible power value 174, $P_{max,t}$, at time t. In an embodiment, normalizer 143 includes a computer system, such as computer system 400 as shown in FIG. 4, executing a set of logical operations normalizing aggregate power output time series data 166 by dividing each power value $P_t$, among aggregate power output time series data 166, at time t, by maximum possible power value 174, $P_{max,t}$, at time t. In an embodiment, normalizer 143 includes a computer system, such as computer system/server 412 as shown in FIG. 4, executing a set of logical operations normalizing aggregate power output time series data 166 by dividing each power value $P_t$, among aggregate power output time series data 166, at time t, by maximum possible power value 174, $P_{max,t}$, at time t. In an embodiment, normalizer 143 includes a computer system, such as processing unit 416 as shown in FIG. 4, executing a set of logical operations normalizing aggregate power output time series data 166 by dividing each power value $P_t$, among aggregate power output time series data 166, at time t, by maximum possible power value 174, $P_{max,t}$, at time t.

In an embodiment, normalizer 143 is implemented as computer software executing on a computer system, such as computer system 400 as shown in FIG. 4, such that the computer system executes a set of logical operations normalizing aggregate power output time series data 166 by dividing each power value $P_t$, among aggregate power output time series data 166, at time t, by maximum possible power value 174, $P_{max,t}$, at time t. In an embodiment, normalizer 143 is implemented as computer software executing on a computer system, such as computer system/server 412 as shown in FIG. 4, such that the computer system executes a set of logical operations normalizing aggregate power output time series data 166 by dividing each power value $P_t$, among aggregate power output time series data 166, at time t, by maximum possible power value 174, $P_{max,t}$, at time t. In an embodiment, normalizer 143 is implemented as computer software executing on a computer system, such as processing unit 416 as shown in FIG. 4 such that the computer system executes a set of logical operations normalizing aggregate power output time series data 166 by dividing each power value $P_t$, among aggregate power output time series data 166, at time t, by maximum possible power value 174, $P_{max,t}$, at time t. In an embodiment, normalizer 143 executes a set of logical operations normalizing aggregate power output time series data 166 by dividing each power value $P_t$, among aggregate power output time series data 166, at time t, by maximum possible power value 174, $P_{max,t}$, at time t as computer software executing on a processor/processing unit of normalizer 143.

In an embodiment, normalizer 143 is a machine learning computer software/program/algorithm executing a set of logical operations normalizing aggregate power output time series data 166 by dividing each power value $P_t$, among aggregate power output time series data 166, at time t, by maximum possible power value 174, $P_{max,t}$, at time t. In an embodiment, normalizer 143 is a cognitive computing platform executing a set of logical operations normalizing aggregate power output time series data 166 by dividing each power value $P_t$, among aggregate power output time series data 166, at time t, by maximum possible power value 174, $P_{max,t}$, at time t. In an embodiment, normalizer 143 is an artificial intelligence executing a set of logical operations normalizing aggregate power output time series data 166 by dividing each power value $P_t$, among aggregate power output time series data 166, at time t, by maximum possible power value 174, $P_{max,t}$, at time t.

Photovoltaic Stations

In a particular embodiment, the plurality of renewable energy source stations includes a plurality of photovoltaic stations. In a specific embodiment, the plurality of renewable energy source stations is a plurality of photovoltaic stations. For example, the renewable energy stations are photovoltaic stations.

Clear-Sky Day

Figure 2A:
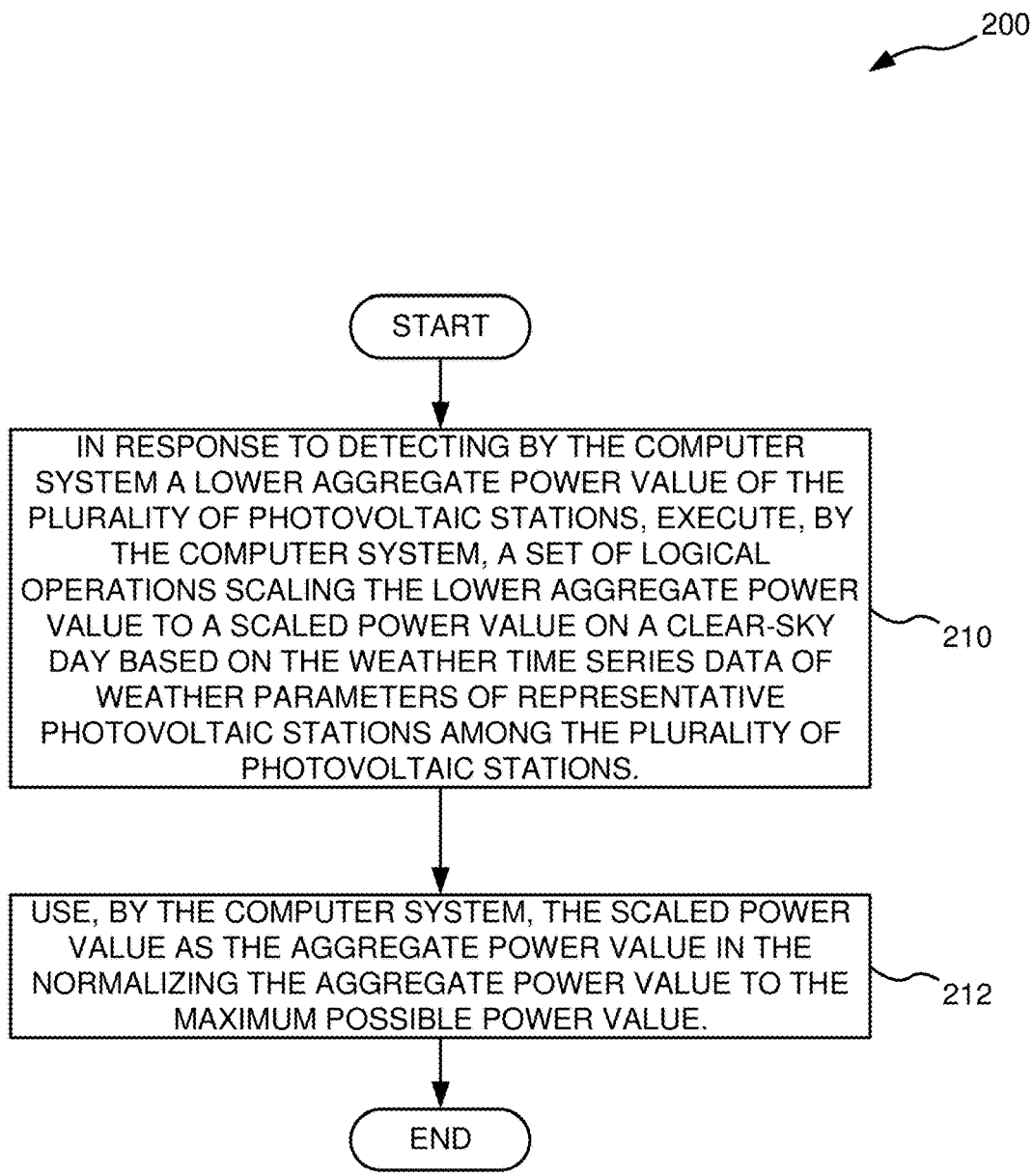
FIG. 2A depicts a flowchart in accordance with an embodiment of the present invention.

In a particular embodiment, the normalizing further includes (a) in response to detecting by the computer system a lower aggregate power value of the plurality of photovoltaic stations, executing, by the computer system, a set of logical operations scaling the lower aggregate power value to a scaled power value on a clear-sky day based on the weather time series data of weather parameters of representative photovoltaic stations among the plurality of photovoltaic stations, and (b) using, by the computer system, the scaled power value as the aggregate power value in the normalizing the aggregate power value to the maximum possible power value. Referring to FIG. 2A, in a particular embodiment, normalizing operation 118 further includes an operation 210 of in response to detecting by the computer system a lower aggregate power value of the plurality of photovoltaic stations, executing, by the computer system, a set of logical operations scaling the lower aggregate power value to a scaled power value on a clear-sky day based on the weather time series data of weather parameters of representative photovoltaic stations among the plurality of photovoltaic stations, and an operation 212 of using, by the computer system, the scaled power value as the aggregate power value in the normalizing the aggregate power value to the maximum possible power value.

In an embodiment, normalizer 143 includes a computer system 400 as shown in FIG. 4, that executes a modeling and calculating aggregate power of a set of renewable energy source stations using power output from representative renewable energy source stations script or computer software application that carries out the operations of at least method 200. In an embodiment, normalizer 143 includes a computer system/server 412 as shown in FIG. 4, that executes a modeling and calculating aggregate power of a set of renewable energy source stations using power output from representative renewable energy source stations script or computer software application that carries out the operations of at least method 200. In an embodiment, normalizer 143 includes a processing unit 416 as shown in FIG. 4, that executes a modeling and calculating aggregate power of a set of renewable energy source stations using power output from representative renewable energy source stations script or computer software application that carries out the operations of at least method 200. In an embodiment, normalizer 143 includes a computer system 400 as shown in FIG. 4, that executes a modeling and calculating aggregate power of a set of renewable energy source stations using power output from representative renewable energy source stations script or computer software application that carries out at least operations 210 and 212. In an embodiment, normalizer 143 includes a computer system/server 412 as shown in FIG. 4, that executes a modeling and calculating aggregate power of a set of renewable energy source stations using power output from representative renewable energy source stations script or computer software application that carries out at least operations 210 and 212. In an embodiment, normalizer 143 includes a processing unit 416 as shown in FIG. 4, that executes a modeling and calculating aggregate power of a set of renewable energy source stations using power output from representative renewable energy source stations script or computer software application that carries out at least operations 210 and 212.

In an embodiment, normalizer 143 is a machine learning computer software/program/algorithm that executes a modeling and calculating aggregate power of a set of renewable energy source stations using power output from representative renewable energy source stations script or computer software application that carries out the operations of at least method 200. In an embodiment, normalizer 143 is a machine learning computer software/program/algorithm that executes a modeling and calculating aggregate power of a set of renewable energy source stations using power output from representative renewable energy source stations script or computer software application that carries out at least operations 210 and 212. In an embodiment, normalizer 143 is a cognitive computing platform that executes a modeling and calculating aggregate power of a set of renewable energy source stations using power output from representative renewable energy source stations script or computer software application that carries out the operations of at least method 200. In an embodiment, normalizer 143 is a cognitive computing platform that executes a modeling and calculating aggregate power of a set of renewable energy source stations using power output from representative renewable energy source stations script or computer software application that carries out at least operations 210 and 212. In an embodiment, normalizer 143 is an artificial intelligence that executes a modeling and calculating aggregate power of a set of renewable energy source stations using power output from representative renewable energy source stations script or computer software application that carries out the operations of at least method 200. In an embodiment, normalizer 143 is an artificial intelligence that executes a modeling and calculating aggregate power of a set of renewable energy source stations using power output from representative renewable energy source stations script or computer software application that carries out at least operations 210 and 212.

In an embodiment, normalizer 143 is configured to execute a set of logical operations scaling a lower aggregate power value to a scaled power value on a clear-sky day based on weather time series data 164 of weather parameters of representative photovoltaic stations among the plurality of photovoltaic stations, in response to detecting a lower aggregate power value of the plurality of photovoltaic stations. In an embodiment, normalizer 143 includes a computer system, such as computer system 400 as shown in FIG. 4, performing operation 210. In an embodiment, normalizer 143 includes a computer system, such as computer system/server 412 as shown in FIG. 4, performing operation 210. In an embodiment, normalizer 143 includes a computer system, such as processing unit 416 as shown in FIG. 4, performing operation 210. In an embodiment, normalizer 143 is implemented as computer software executing on a computer system, such as computer system 400 as shown in FIG. 4 such that the computer system performs operation 210. In an embodiment, normalizer 143 is implemented as computer software executing on a computer system, such as computer system/server 412 as shown in FIG. 4, such that the computer system performs operation 210. In an embodiment, normalizer 143 is implemented as computer software executing on a computer system, such as processing unit 416 as shown in FIG. 4 such that the computer system performs operation 210. In an embodiment, normalizer 143 performs operation 210 as computer software executing on a processor of normalizer 143. In an embodiment, normalizer 143 includes a computer system, such as a machine learning computer software/program/algorithm performing operation 210. In an embodiment, normalizer 143 includes a computer system, such as a cognitive computing platform performing operation 210. In an embodiment, normalizer 143 includes a computer system, such as an artificial intelligence performing operation 210.

In an embodiment, normalizer 143 is configured to use the scaled power value as aggregate power value 172 in the normalizing aggregate power value 172 to maximum possible power value 174. In an embodiment, normalizer 143 includes a computer system, such as computer system 400 as shown in FIG. 4, performing operation 212. In an embodiment, normalizer 143 includes a computer system, such as computer system/server 412 as shown in FIG. 4, performing operation 212. In an embodiment, normalizer 143 includes a computer system, such as processing unit 416 as shown in FIG. 4, performing operation 212. In an embodiment, normalizer 143 is implemented as computer software executing on a computer system, such as computer system 400 as shown in FIG. 4 such that the computer system performs operation 212. In an embodiment, normalizer 143 is implemented as computer software executing on a computer system, such as computer system/server 412 as shown in FIG. 4, such that the computer system performs operation 212. In an embodiment, normalizer 143 is implemented as computer software executing on a computer system, such as processing unit 416 as shown in FIG. 4 such that the computer system performs operation 212. In an embodiment, normalizer 143 performs operation 212 as computer software executing on a processor of normalizer 143. In an embodiment, normalizer 143 includes a computer system, such as a machine learning computer software/program/algorithm performing operation 212. In an embodiment, normalizer 143 includes a computer system, such as a cognitive computing platform performing operation 212. In an embodiment, normalizer 143 includes a computer system, such as an artificial intelligence performing operation 212.

Detecting Changes to Installed Capacity

In a particular embodiment, the normalizing further includes detecting, by the computer system, at least one change to an installed capacity of the plurality of photovoltaic stations. In a particular embodiment, normalizing operation 118 further includes an operation of detecting, by the computer system, at least one change to an installed capacity of the plurality of photovoltaic stations. In an embodiment, normalizer 143 is configured to detect at least one change to an installed capacity of the plurality of photovoltaic stations. In an embodiment, normalizer 143 includes a computer system, such as computer system 400 as shown in FIG. 4, detecting at least one change to an installed capacity of the plurality of photovoltaic stations. In an embodiment, normalizer 143 includes a computer system, such as computer system/server 412 as shown in FIG. 4, detecting at least one change to an installed capacity of the plurality of photovoltaic stations. In an embodiment, normalizer 143 includes a computer system, such as processing unit 416 as shown in FIG. 4, detecting at least one change to an installed capacity of the plurality of photovoltaic stations. In an embodiment, normalizer 143 is implemented as computer software executing on a computer system, such as computer system 400 as shown in FIG. 4, such that the computer system detects at least one change to an installed capacity of the plurality of photovoltaic stations.

In an embodiment, normalizer 143 is implemented as computer software executing on a computer system, such as computer system/server 412 as shown in FIG. 4, such that the computer system detects at least one change to an installed capacity of the plurality of photovoltaic stations. In an embodiment, normalizer 143 is implemented as computer software executing on a computer system, such as processing unit 416 as shown in FIG. 4 such that the computer system detects at least one change to an installed capacity of the plurality of photovoltaic stations. In an embodiment, normalizer 143 detects at least one change to an installed capacity of the plurality of photovoltaic stations as computer software executing on a processor/processing unit of normalizer 143.

In an embodiment, normalizer 143 is a machine learning computer software/program/algorithm detecting at least one change to an installed capacity of the plurality of photovoltaic stations. In an embodiment, normalizer 143 is a cognitive computing platform detecting at least one change to an installed capacity of the plurality of photovoltaic stations. In an embodiment, normalizer 143 is an artificial intelligence detecting at least one change to an installed capacity of the plurality of photovoltaic stations.

Using Solar Irradiance

Figure 2B:
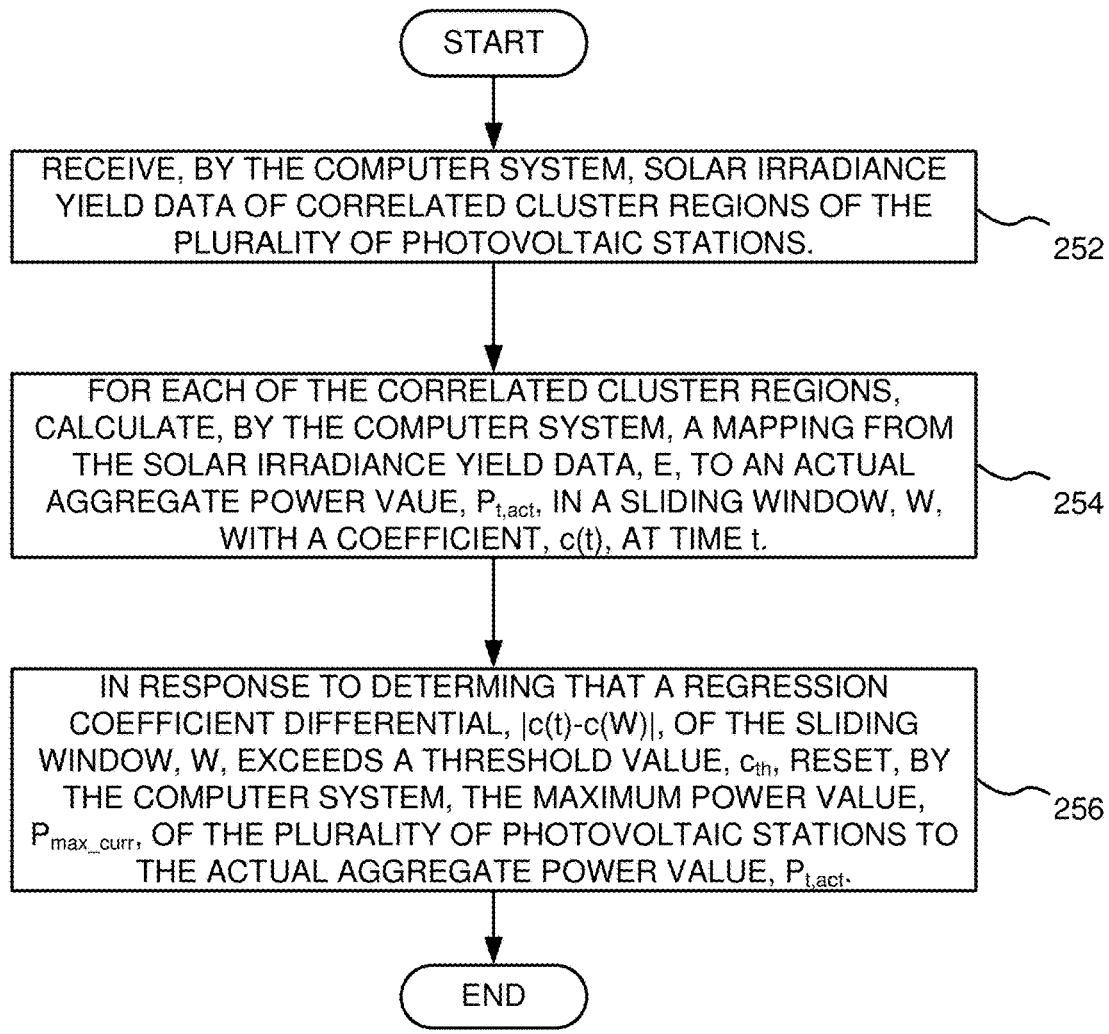
FIG. 2B depicts a flowchart in accordance with an embodiment of the present invention.

In a particular embodiment, the detecting includes (a) receiving, by the computer system, solar irradiance yield data of correlated cluster regions of the plurality of photovoltaic stations, (b) for each of the correlated cluster regions, calculating, by the computer system, a mapping from the solar irradiance yield data, E, to an actual (i.e., measured)

aggregate power value, $P_{t,act}$, in a sliding window, W, with a coefficient, c(t), at time t, and (c) in response to determining that a regression coefficient differential, $|c(t)-c(W)|$, of the sliding window, W, exceeds a threshold value, $c_{th}$, resetting, by the computer system, the maximum power value, $P_{max\_curr}$, of the plurality of photovoltaic stations to the aggregate power value, $P_{t,act}$. Referring to FIG. 2B, in a particular embodiment, the detecting operation includes an operation 252 of receiving, by the computer system, solar irradiance yield data of correlated cluster regions of the plurality of photovoltaic stations, an operation 254 of for each of the correlated cluster regions, calculating, by the computer system, a mapping from the solar irradiance yield data, E, to an actual aggregate power value, $P_{t,act}$, in a sliding window, W, with a coefficient, c(t), at time t, and an operation 256 of in response to determining that a regression coefficient differential, $|c(t)-c(W)|$, of the sliding window, W, exceeds a threshold value, $c_{th}$, resetting, by the computer system, the maximum power value, $P_{max\_curr}$, of the plurality of photovoltaic stations to the actual aggregate power value, $P_{t,act}$.

In an embodiment, normalizer 143 includes a computer system 400 as shown in FIG. 4, that executes a modeling and calculating aggregate power of a set of renewable energy source stations using power output from representative renewable energy source stations script or computer software application that carries out the operations of at least method 250. In an embodiment, normalizer 143 includes a computer system/server 412 as shown in FIG. 4, that executes a modeling and calculating aggregate power of a set of renewable energy source stations using power output from representative renewable energy source stations script or computer software application that carries out the operations of at least method 250. In an embodiment, normalizer 143 includes a processing unit 416 as shown in FIG. 4, that executes a modeling and calculating aggregate power of a set of renewable energy source stations using power output from representative renewable energy source stations script or computer software application that carries out the operations of at least method 250. In an embodiment, normalizer 143 includes a computer system 400 as shown in FIG. 4, that executes a modeling and calculating aggregate power of a set of renewable energy source stations using power output from representative renewable energy source stations script or computer software application that carries out at least operations 252, 254, and 256. In an embodiment, normalizer 143 includes a computer system/server 412 as shown in FIG. 4, that executes a modeling and calculating aggregate power of a set of renewable energy source stations using power output from representative renewable energy source stations script or computer software application that carries out at least operations 252, 254, and 256. In an embodiment, normalizer 143 includes a processing unit 416 as shown in FIG. 4, that executes a modeling and calculating aggregate power of a set of renewable energy source stations using power output from representative renewable energy source stations script or computer software application that carries out at least operations 252, 254, and 256.

In an embodiment, normalizer 143 is a machine learning computer software/program/algorithm that executes a modeling and calculating aggregate power of a set of renewable energy source stations using power output from representative renewable energy source stations script or computer software application that carries out the operations of at least method 250. In an embodiment, normalizer 143 is a machine learning computer software/program/algorithm that executes a modeling and calculating aggregate power of a set of renewable energy source stations using power output from representative renewable energy source stations script or computer software application that carries out at least operations 252, 254, and 256. In an embodiment, normalizer 143 is a cognitive computing platform that executes a modeling and calculating aggregate power of a set of renewable energy source stations using power output from representative renewable energy source stations script or computer software application that carries out the operations of at least method 250. In an embodiment, normalizer 143 is a cognitive computing platform that executes a modeling and calculating aggregate power of a set of renewable energy source stations using power output from representative renewable energy source stations script or computer software application that carries out at least operations 252, 254, and 256. In an embodiment, normalizer 143 is an artificial intelligence that executes a modeling and calculating aggregate power of a set of renewable energy source stations using power output from representative renewable energy source stations script or computer software application that carries out the operations of at least method 250. In an embodiment, normalizer 143 is an artificial intelligence that executes a modeling and calculating aggregate power of a set of renewable energy source stations using power output from representative renewable energy source stations script or computer software application that carries out at least operations 252, 254, and 256.

In an embodiment, normalizer 143 is configured to receive solar irradiance yield data of correlated cluster regions of the plurality of photovoltaic stations. In an embodiment, normalizer 143 includes a computer system, such as computer system 400 as shown in FIG. 4, performing operation 252. In an embodiment, normalizer 143 includes a computer system, such as computer system/server 412 as shown in FIG. 4, performing operation 252. In an embodiment, normalizer 143 includes a computer system, such as processing unit 416 as shown in FIG. 4, performing operation 252. In an embodiment, normalizer 143 is implemented as computer software executing on a computer system, such as computer system 400 as shown in FIG. 4 such that the computer system performs operation 252. In an embodiment, normalizer 143 is implemented as computer software executing on a computer system, such as computer system/server 412 as shown in FIG. 4, such that the computer system performs operation 252. In an embodiment, normalizer 143 is implemented as computer software executing on a computer system, such as processing unit 416 as shown in FIG. 4 such that the computer system performs operation 252. In an embodiment, normalizer 143 performs operation 252 as computer software executing on a processor of normalizer 143. In an embodiment, normalizer 143 includes a computer system, such as a machine learning computer software/program/algorithm performing operation 252. In an embodiment, normalizer 143 includes a computer system, such as a cognitive computing platform performing operation 252. In an embodiment, normalizer 143 includes a computer system, such as an artificial intelligence performing operation 252.

In an embodiment, normalizer 143 is configured to calculate, for each of the correlated cluster regions, a mapping from the solar irradiance yield data, E, to an actual aggregate power value, $P_{t,act}$, in a sliding window, W, with a coefficient, c(t), at time t. In an embodiment, normalizer 143 includes a computer system, such as computer system 400 as shown in FIG. 4, performing operation 254. In an embodiment, normalizer 143 includes a computer system, such as computer system/server 412 as shown in FIG. 4, performing operation 254. In an embodiment, normalizer 143 includes a computer system, such as processing unit 416 as shown in FIG. 4, performing operation 254. In an embodiment, normalizer 143 is implemented as computer software executing on a computer system, such as computer system 400 as shown in FIG. 4 such that the computer system performs operation 254. In an embodiment, normalizer 143 is implemented as computer software executing on a computer system, such as computer system/server 412 as shown in FIG. 4, such that the computer system performs operation 254. In an embodiment, normalizer 143 is implemented as computer software executing on a computer system, such as processing unit 416 as shown in FIG. 4 such that the computer system performs operation 254. In an embodiment, normalizer 143 performs operation 254 as computer software executing on a processor of normalizer 143. In an embodiment, normalizer 143 includes a computer system, such as a machine learning computer software/program/algorithm performing operation 254. In an embodiment, normalizer 143 includes a computer system, such as a cognitive computing platform performing operation 254. In an embodiment, normalizer 143 includes a computer system, such as an artificial intelligence performing operation 254.

In an embodiment, normalizer 143 is configured to reset maximum power value 174, $P_{max\_curr}$, of the plurality of photovoltaic stations to the actual aggregate power value, $P_{t,act}$, in response to determining that a regression coefficient differential, $|c(t)-c(W)|$, of the sliding window, W, exceeds a threshold value, $c_{th}$. In an embodiment, normalizer 143 includes a computer system, such as computer system 400 as shown in FIG. 4, performing operation 256. In an embodiment, normalizer 143 includes a computer system, such as computer system/server 412 as shown in FIG. 4, performing operation 256. In an embodiment, normalizer 143 includes a computer system, such as processing unit 416 as shown in FIG. 4, performing operation 256. In an embodiment, normalizer 143 is implemented as computer software executing on a computer system, such as computer system 400 as shown in FIG. 4 such that the computer system performs operation 256. In an embodiment, normalizer 143 is implemented as computer software executing on a computer system, such as computer system/server 412 as shown in FIG. 4, such that the computer system performs operation 256. In an embodiment, normalizer 143 is implemented as computer software executing on a computer system, such as processing unit 416 as shown in FIG. 4 such that the computer system performs operation 256. In an embodiment, normalizer 143 performs operation 256 as computer software executing on a processor of normalizer 143. In an embodiment, normalizer 143 includes a computer system, such as a machine learning computer software/program/algorithm performing operation 256. In an embodiment, normalizer 143 includes a computer system, such as a cognitive computing platform performing operation 256. In an embodiment, normalizer 143 includes a computer system, such as an artificial intelligence performing operation 256.

Applying Combined Model

Figure 2C:
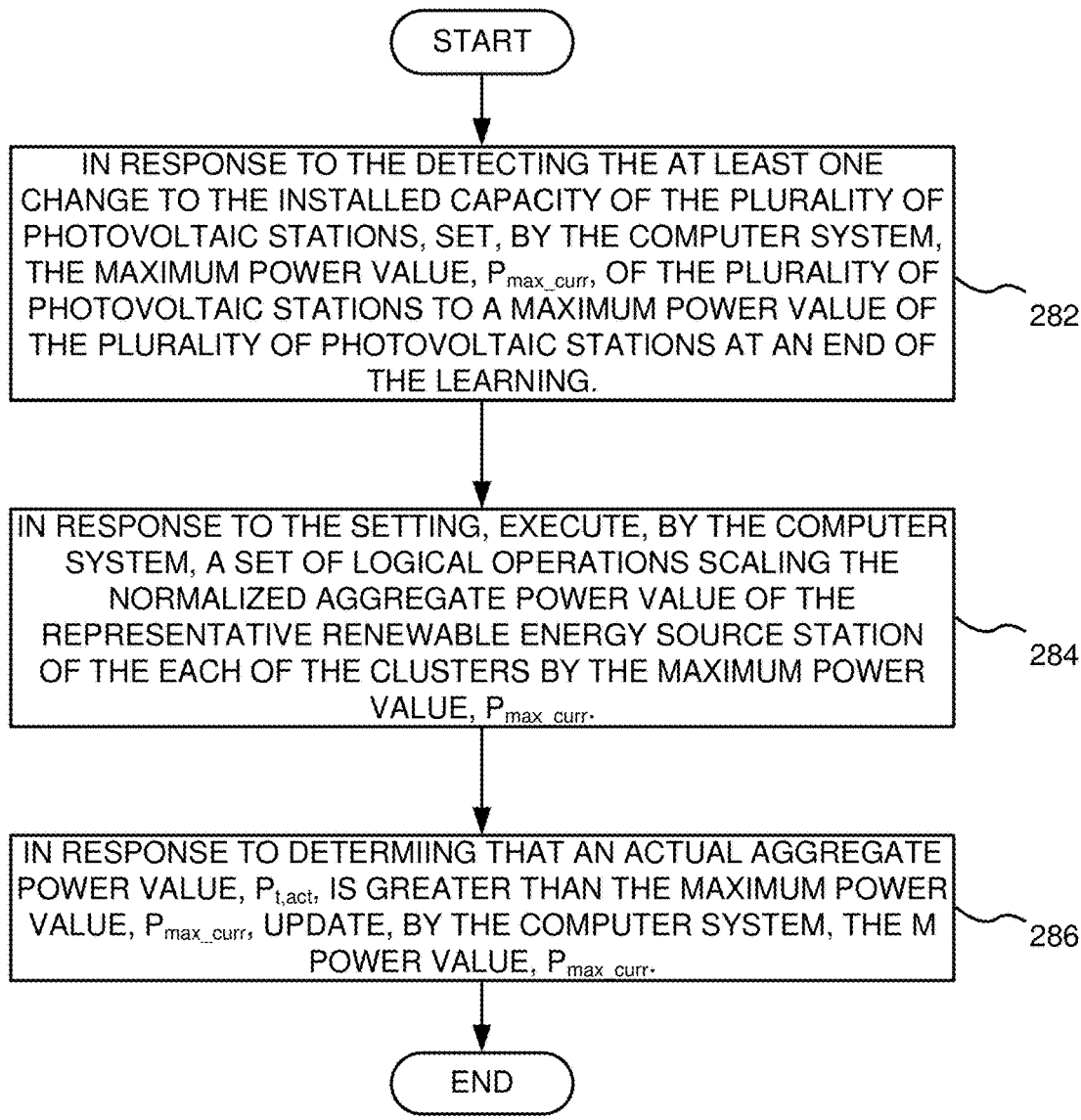
FIG. 2C depicts a flowchart in accordance with an embodiment of the present invention.

In a particular embodiment, the applying includes (a) in response to the detecting the at least one change to the installed capacity of the plurality of photovoltaic stations, setting, by the computer system, the maximum power value, $P_{max\_curr}$, of the plurality of photovoltaic stations to a maximum power value of the plurality of photovoltaic stations at an end of the learning, (b) in response to the setting, executing, by the computer system, a set of logical operations scaling the normalized aggregate output power value of the representative renewable energy source station of the each of the clusters by the maximum power value, $P_{max\_curr}$, and (c) in response to determining that an actual (i.e., measured) aggregate power value, $P_{t,act}$, is greater than the maximum power value, $P_{max\_curr}$, updating, by the computer system, the maximum power value, $P_{max\_curr}$. Referring to FIG. 2C, in a particular embodiment, applying operation 126, includes an operation 282 of in response to the detecting the at least one change to the installed capacity of the plurality of photovoltaic stations, setting, by the computer system, the maximum power value, $P_{max\_curr}$, of the plurality of photovoltaic stations to a maximum power value of the plurality of photovoltaic stations at an end of learning operation 120, an operation 284 of in response to the setting, executing, by the computer system, a set of logical operations scaling the normalized aggregate output power value of the representative renewable energy source station of the each of the clusters by the maximum power value, $P_{max\_curr}$, and an operation 286 of in response to determining that an actual aggregate power value, $P_{t,act}$, is greater than the maximum power value, $P_{max\_curr}$, updating, by the computer system, the maximum power value, $P_{max\_curr}$.

In an embodiment, applier 156 includes a computer system 400 as shown in FIG. 4, that executes a modeling and calculating aggregate power of a set of renewable energy source stations using power output from representative renewable energy source stations script or computer software application that carries out the operations of at least method 280. In an embodiment, applier 156 includes a computer system/server 412 as shown in FIG. 4, that executes a modeling and calculating aggregate power of a set of renewable energy source stations using power output from representative renewable energy source stations script or computer software application that carries out the operations of at least method 280. In an embodiment, applier 156 includes a processing unit 416 as shown in FIG. 4, that executes a modeling and calculating aggregate power of a set of renewable energy source stations using power output from representative renewable energy source stations script or computer software application that carries out the operations of at least method 280. In an embodiment, applier 156 includes a computer system 400 as shown in FIG. 4, that executes a modeling and calculating aggregate power of a set of renewable energy source stations using power output from representative renewable energy source stations script or computer software application that carries out at least operations 282, 284, and 286. In an embodiment, applier 156 includes a computer system/server 412 as shown in FIG. 4, that executes a modeling and calculating aggregate power of a set of renewable energy source stations using power output from representative renewable energy source stations script or computer software application that carries out at least operations 282, 284, and 286. In an embodiment, applier 156 includes a processing unit 416 as shown in FIG. 4, that executes a modeling and calculating aggregate power of a set of renewable energy source stations using power output from representative renewable energy source stations script or computer software application that carries out at least operations 282, 284, and 286.

In an embodiment, applier 156 is a machine learning computer software/program/algorithm that executes a modeling and calculating aggregate power of a set of renewable energy source stations using power output from representative renewable energy source stations script or computer software application that carries out the operations of at least method 280. In an embodiment, applier 156 is a machine learning computer software/program/algorithm that executes a modeling and calculating aggregate power of a set of renewable energy source stations using power output from representative renewable energy source stations script or computer software application that carries out at least operations 282, 284, and 286. In an embodiment, applier 156 is a cognitive computing platform that executes a modeling and calculating aggregate power of a set of renewable energy source stations using power output from representative renewable energy source stations script or computer software application that carries out the operations of at least method 280. In an embodiment, applier 156 is a cognitive computing platform that executes a modeling and calculating aggregate power of a set of renewable energy source stations using power output from representative renewable energy source stations script or computer software application that carries out at least operations 282, 284, and 286. In an embodiment, applier 156 is an artificial intelligence that executes a modeling and calculating aggregate power of a set of renewable energy source stations using power output from representative renewable energy source stations script or computer software application that carries out the operations of at least method 280. In an embodiment, applier 156 is an artificial intelligence that executes a modeling and calculating aggregate power of a set of renewable energy source stations using power output from representative renewable energy source stations script or computer software application that carries out at least operations 282, 284, and 286.

In an embodiment, applier 156 is configured to set maximum power value 174, $P_{max\_curr}$, of the plurality of photovoltaic stations to a maximum power value of the plurality of photovoltaic stations at an end of learning operation 120, in response to the detecting the at least one change to the installed capacity of the plurality of photovoltaic stations. In an embodiment, applier 156 includes a computer system, such as computer system 400 as shown in FIG. 4, performing operation 282. In an embodiment, applier 156 includes a computer system, such as computer system/server 412 as shown in FIG. 4, performing operation 282. In an embodiment, applier 156 includes a computer system, such as processing unit 416 as shown in FIG. 4, performing operation 282. In an embodiment, applier 156 is implemented as computer software executing on a computer system, such as computer system 400 as shown in FIG. 4 such that the computer system performs operation 282. In an embodiment, applier 156 is implemented as computer software executing on a computer system, such as computer system/server 412 as shown in FIG. 4, such that the computer system performs operation 282. In an embodiment, applier 156 is implemented as computer software executing on a computer system, such as processing unit 416 as shown in FIG. 4 such that the computer system performs operation 282. In an embodiment, applier 156 performs operation 282 as computer software executing on a processor of applier 156. In an embodiment, applier 156 includes a computer system, such as a machine learning computer software/program/algorithm performing operation 282. In an embodiment, applier 156 includes a computer system, such as a cognitive computing platform performing operation 282. In an embodiment, applier 156 includes a computer system, such as an artificial intelligence performing operation 282.

In an embodiment, applier 156 is configured to execute a set of logical operations scaling normalized aggregate output power value 186 of representative renewable energy source station 182 of the each of clusters 180 by maximum power value 174, $P_{max\_curr}$, in response to setting operation 282. In an embodiment, applier 156 includes a computer system, such as computer system 400 as shown in FIG. 4, performing operation 284. In an embodiment, applier 156 includes a computer system, such as computer system/server 412 as shown in FIG. 4, performing operation 284. In an embodiment, applier 156 includes a computer system, such as processing unit 416 as shown in FIG. 4, performing operation 284. In an embodiment, applier 156 is implemented as computer software executing on a computer system, such as computer system 400 as shown in FIG. 4 such that the computer system performs operation 284. In an embodiment, applier 156 is implemented as computer software executing on a computer system, such as computer system/server 412 as shown in FIG. 4, such that the computer system performs operation 284. In an embodiment, applier 156 is implemented as computer software executing on a computer system, such as processing unit 416 as shown in FIG. 4 such that the computer system performs operation 284. In an embodiment, applier 156 performs operation 284 as computer software executing on a processor of applier 156. In an embodiment, applier 156 includes a computer system, such as a machine learning computer software/program/algorithm performing operation 284. In an embodiment, applier 156 includes a computer system, such as a cognitive computing platform performing operation 284. In an embodiment, applier 156 includes a computer system, such as an artificial intelligence performing operation 284.

In an embodiment, applier 156 is configured to update maximum power value 174, $P_{max\_curr}$, in response to determining that an actual aggregate power value, $P_{t,act}$, is greater than maximum power value 174, $P_{max\_curr}$. In an embodiment, applier 156 includes a computer system, such as computer system 400 as shown in FIG. 4, performing operation 286. In an embodiment, applier 156 includes a computer system, such as computer system/server 412 as shown in FIG. 4, performing operation 286. In an embodiment, applier 156 includes a computer system, such as processing unit 416 as shown in FIG. 4, performing operation 286. In an embodiment, applier 156 is implemented as computer software executing on a computer system, such as computer system 400 as shown in FIG. 4 such that the computer system performs operation 286. In an embodiment, applier 156 is implemented as computer software executing on a computer system, such as computer system/server 412 as shown in FIG. 4, such that the computer system performs operation 286. In an embodiment, applier 156 is implemented as computer software executing on a computer system, such as processing unit 416 as shown in FIG. 4 such that the computer system performs operation 286. In an embodiment, applier 156 performs operation 286 as computer software executing on a processor of applier 156. In an embodiment, applier 156 includes a computer system, such as a machine learning computer software/program/algorithm performing operation 286. In an embodiment, applier 156 includes a computer system, such as a cognitive computing platform performing operation 286. In an embodiment, applier 156 includes a computer system, such as an artificial intelligence performing operation 286.

De-Normalizing Normalized Aggregate Power Value

In an exemplary embodiment, the de-normalizing includes scaling, by the computer system, the normalized aggregate output power model of the each of the clusters, among the learned regression models, by the maximum possible power value, resulting in the de-normalized aggregate output power model of the each of the clusters. In an exemplary embodiment, de-normalizing operation 122 includes an operation of scaling, by the computer system, the normalized aggregate output power model of the each of the clusters, among the learned regression models, by the maximum possible power value, resulting in the de-normalized aggregate output power model of the each of the clusters. In an embodiment, de-normalizer 150 is configured to scale the normalized aggregate output power model of each of clusters 180, among learned regression models 188, by maximum possible power value 174, resulting in de-normalized aggregate output power model 190 of each of clusters 180. In an embodiment, de-normalizer 150 includes a computer system, such as computer system 400 as shown in FIG. 4, scaling the normalized aggregate output power model of each of clusters 180, among learned regression models 188, by maximum possible power value 174, resulting in de-normalized aggregate output power model 190 of each of clusters 180. In an embodiment, de-normalizer 150 includes a computer system, such as computer system/server 412 as shown in FIG. 4, scaling the normalized aggregate output power model of each of clusters 180, among learned regression models 188, by maximum possible power value 174, resulting in de-normalized aggregate output power model 190 of each of clusters 180. In an embodiment, de-normalizer 150 includes a computer system, such as processing unit 416 as shown in FIG. 4, scaling the normalized aggregate output power model of each of clusters 180, among learned regression models 188, by maximum possible power value 174, resulting in de-normalized aggregate output power model 190 of each of clusters 180.

In an embodiment, de-normalizer 150 is implemented as computer software executing on a computer system, such as computer system 400 as shown in FIG. 4, such that the computer system scales the normalized aggregate output power model of each of clusters 180, among learned regression models 188, by maximum possible power value 174, resulting in de-normalized aggregate output power model 190 of each of clusters 180. In an embodiment, de-normalizer 150 is implemented as computer software executing on a computer system, such as computer system/server 412 as shown in FIG. 4, such that the computer system scales the normalized aggregate output power model of each of clusters 180, among learned regression models 188, by maximum possible power value 174, resulting in de-normalized aggregate output power model 190 of each of clusters 180. In an embodiment, de-normalizer 150 is implemented as computer software executing on a computer system, such as processing unit 416 as shown in FIG. 4 such that the computer system scales the normalized aggregate output power model of each of clusters 180, among learned regression models 188, by maximum possible power value 174, resulting in de-normalized aggregate output power model 190 of each of clusters 180. In an embodiment, de-normalizer 150 scales the normalized aggregate output power model of each of clusters 180, among learned regression models 188, by maximum possible power value 174, resulting in de-normalized aggregate output power model 190 of each of clusters 180 as computer software executing on a processor/processing unit of de-normalizer 150.

In an embodiment, de-normalizer 150 is a machine learning computer software/program/algorithm scaling the normalized aggregate output power model of each of clusters 180, among learned regression models 188, by maximum possible power value 174, resulting in de-normalized aggregate output power model 190 of each of clusters 180. In an embodiment, de-normalizer 150 is a cognitive computing platform scaling the normalized aggregate output power model of each of clusters 180, among learned regression models 188, by maximum possible power value 174, resulting in de-normalized aggregate output power model 190 of each of clusters 180. In an embodiment, de-normalizer 150 is an artificial intelligence scaling the normalized aggregate output power model of each of clusters 180, among learned regression models 188, by maximum possible power value 174, resulting in de-normalized aggregate output power model 190 of each of clusters 180.

Example

Figure 3A:
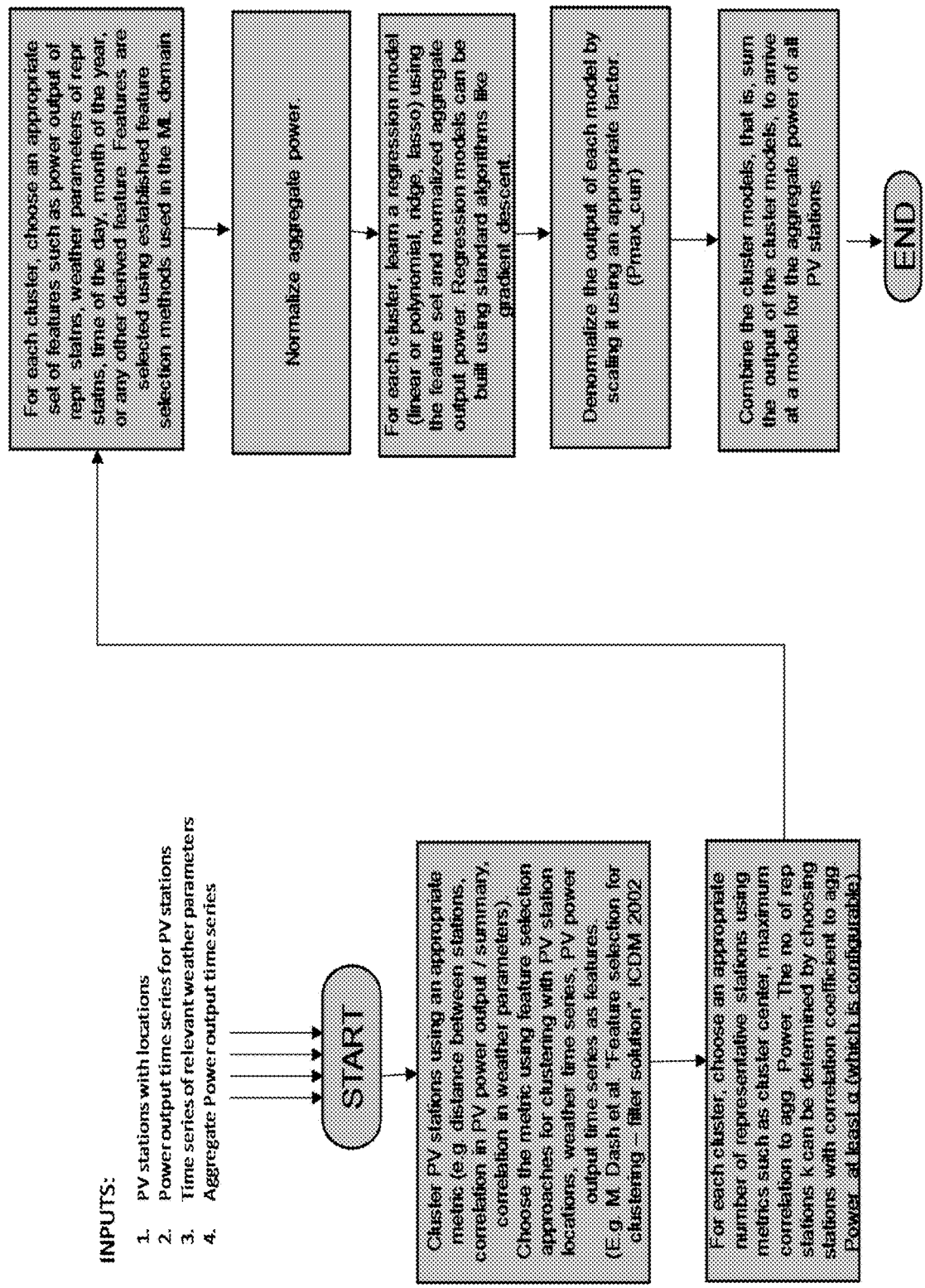
FIG. 3A depicts a flowchart in accordance with an embodiment of the present invention.
Figure 3B:
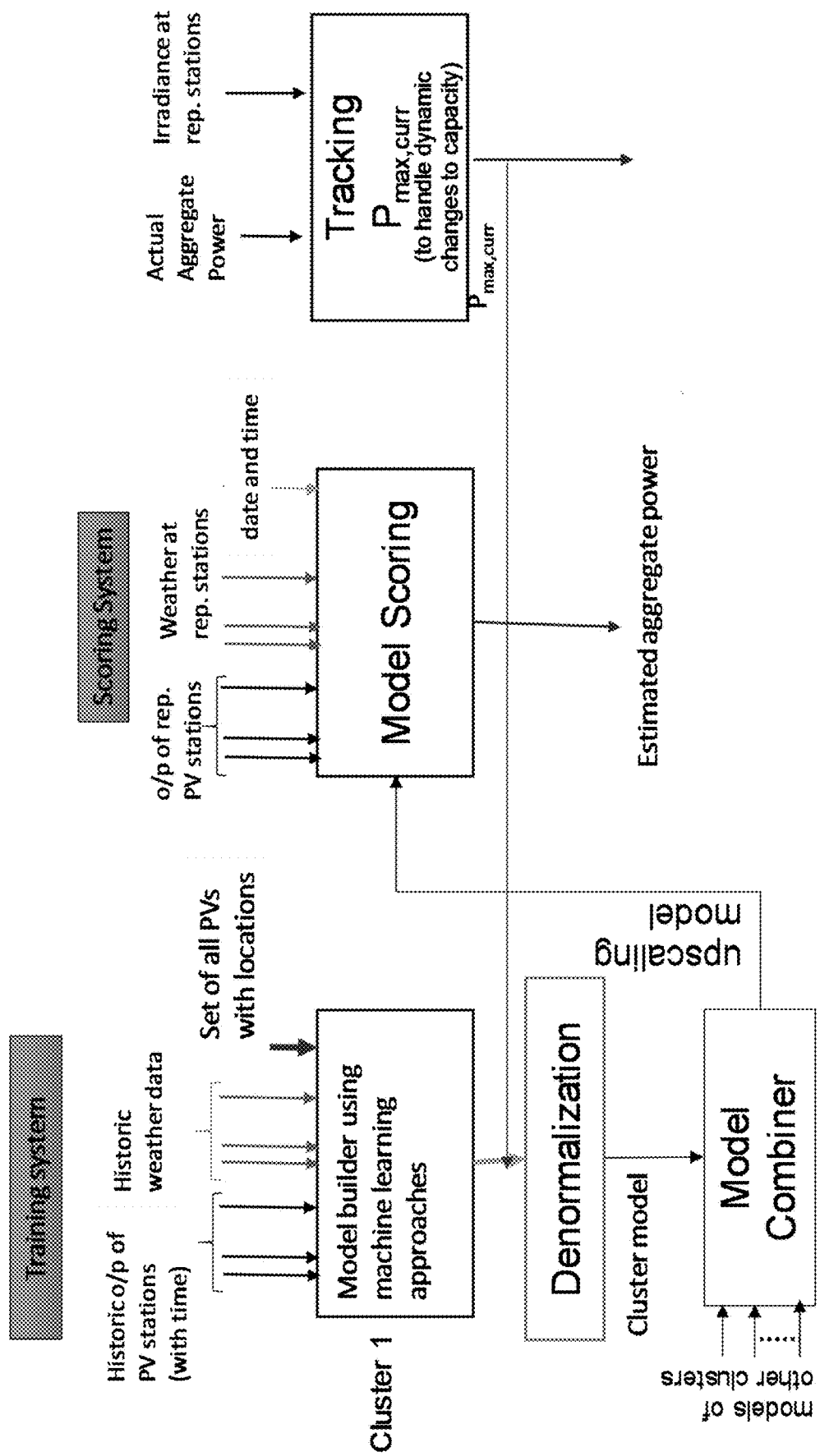
FIG. 3B depicts a block diagram in accordance with an embodiment of the present invention.
Figure 3C:
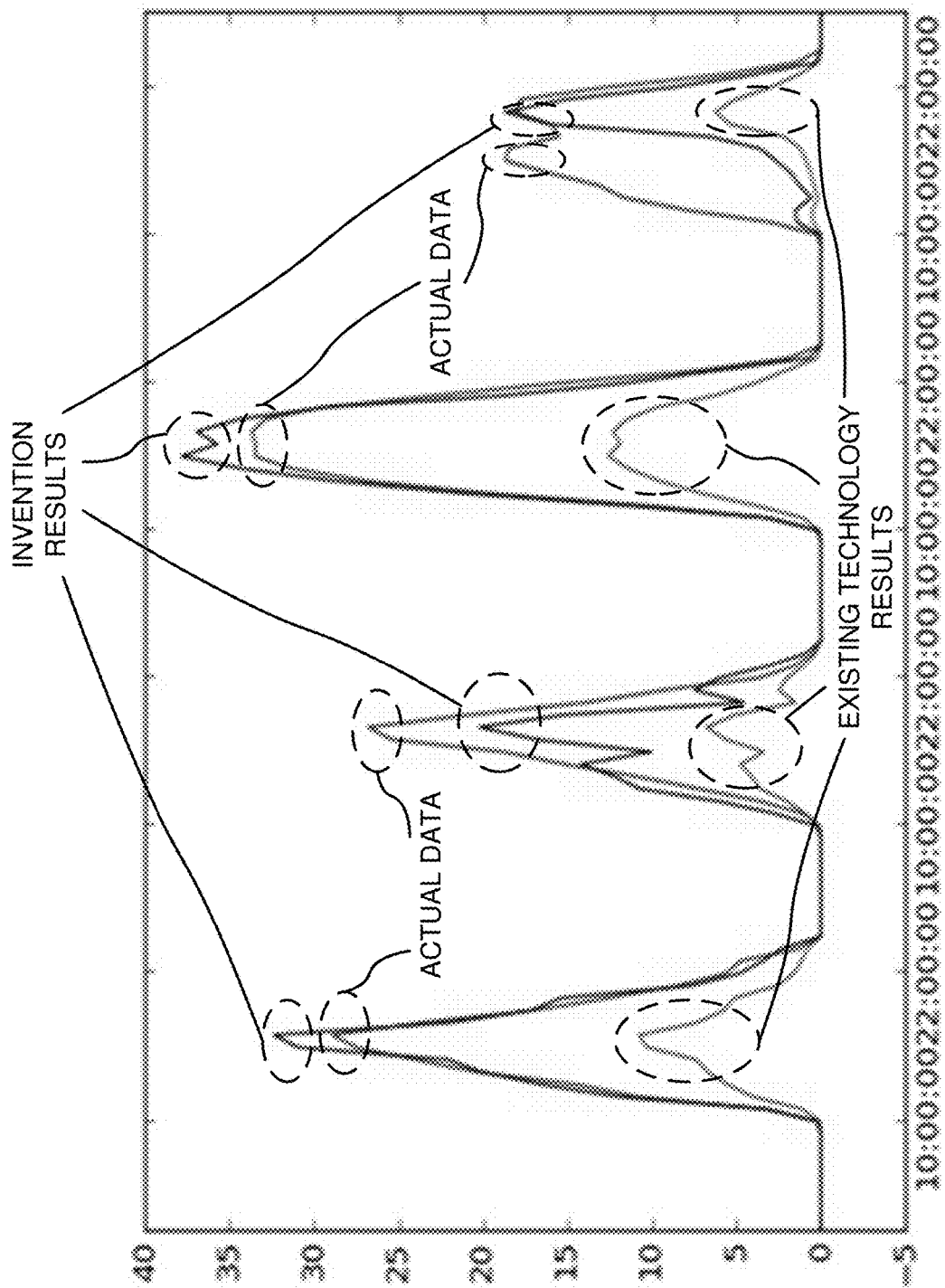
FIG. 3C depicts a graph in accordance with an embodiment of the present invention.

For example, the present invention could model and calculate normalized aggregate power of renewable energy source stations by executing the operations depicted in the flowchart in FIG. 3A. Also, for example, the present invention provides a system as depicted in FIG. 3B. For example, the present invention could model and calculate aggregate power of renewable energy source stations via the system depicted in FIG. 3B. In a specific example, the present invention could (i) apply de-normalization, via a de-normalization component (e.g., de-normalizer 150), to the output of the regression modeler (i.e., model builder) of each cluster to obtain a de-normalized power model for that cluster, (ii) could combine, via a model combiner (e.g., combiner 153), the de-normalized models, and (iii) could use the combined models in scoring (i.e., model scoring). Also, for example, the present invention could track/detect changes to installed capacity at the cluster level (tracking/detecting changes for each cluster individually.) In addition, for example, the present invention has been observed to yield sample results as depicted in FIG. 3C. Specifically, as shown in FIG. 3C, the present invention has been observed, via linear regression, dynamic scaling, and predictor renewable energy sources (i.e., representative renewable energy source stations 182) (e.g., photovoltaic stations) chosen by highest correlation of per-station power time series to aggregate power (e.g., aggregate power value 172), to reduce mean square error (MSE) by approximately 4% to 8.2% (comparing upscaled data as modeled and/or calculated by the present invention to actual data).

Computer System

In an exemplary embodiment, the computer system is a computer system 400 as shown in FIG. 4. Computer system 400 is only one example of a computer system and is not intended to suggest any limitation as to the scope of use or functionality of embodiments of the present invention. Regardless, computer system 400 is capable of being implemented to perform and/or performing any of the functionality/operations of the present invention.

Computer system 400 includes a computer system/server 412, which is operational with numerous other general purpose or special purpose computing system environments or configurations. Examples of well-known computing systems, environments, and/or configurations that may be suitable for use with computer system/server 412 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices.

Computer system/server 412 may be described in the general context of computer system-executable instructions, such as program modules, being executed by a computer system. Generally, program modules may include routines, programs, objects, components, logic, and/or data structures that perform particular tasks or implement particular abstract data types. Computer system/server 412 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, computer system/server 412 in computer system 400 is shown in the form of a general-purpose computing device. The components of computer system/server 412 may include, but are not limited to, one or more processors or processing units 416, a system memory 428, and a bus 418 that couples various system components including system memory 428 to processor 416.

Bus 418 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 412 typically includes a variety of computer system readable media. Such media may be any available media that is accessible by computer system/server 412, and includes both volatile and non-volatile media, removable and non-removable media.

System memory 428 can include computer system readable media in the form of volatile memory, such as random access memory (RAM) 430 and/or cache memory 432. Computer system/server 412 may further include other removable/non-removable, volatile/non-volatile computer system storage media. By way of example only, storage system 434 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 418 by one or more data media interfaces. As will be further depicted and described below, memory 428 may include at least one program product having a set (e.g., at least one) of program modules that are configured to carry out the functions/operations of embodiments of the invention.

Program/utility 440, having a set (at least one) of program modules 442, may be stored in memory 428 by way of example, and not limitation. Exemplary program modules 442 may include an operating system, one or more application programs, other program modules, and program data. Each of the operating system, one or more application programs, other program modules, and program data or some combination thereof, may include an implementation of a networking environment. Program modules 442 generally carry out the functions and/or methodologies of embodiments of the present invention.

Computer system/server 412 may also communicate with one or more external devices 414 such as a keyboard, a pointing device, a display 424, one or more devices that enable a user to interact with computer system/server 412, and/or any devices (e.g., network card, modem, etc.) that enable computer system/server 412 to communicate with one or more other computing devices. Such communication can occur via Input/Output (I/O) interfaces 422. Still yet, computer system/server 412 can communicate with one or more networks such as a local area network (LAN), a general wide area network (WAN), and/or a public network (e.g., the Internet) via network adapter 420. As depicted, network adapter 420 communicates with the other components of computer system/server 412 via bus 418. It should be understood that although not shown, other hardware and/or software components could be used in conjunction with computer system/server 412. Examples, include, but are not limited to: microcode, device drivers, redundant processing units, external disk drive arrays, RAID systems, tape drives, and data archival storage systems.

Cloud Computing

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
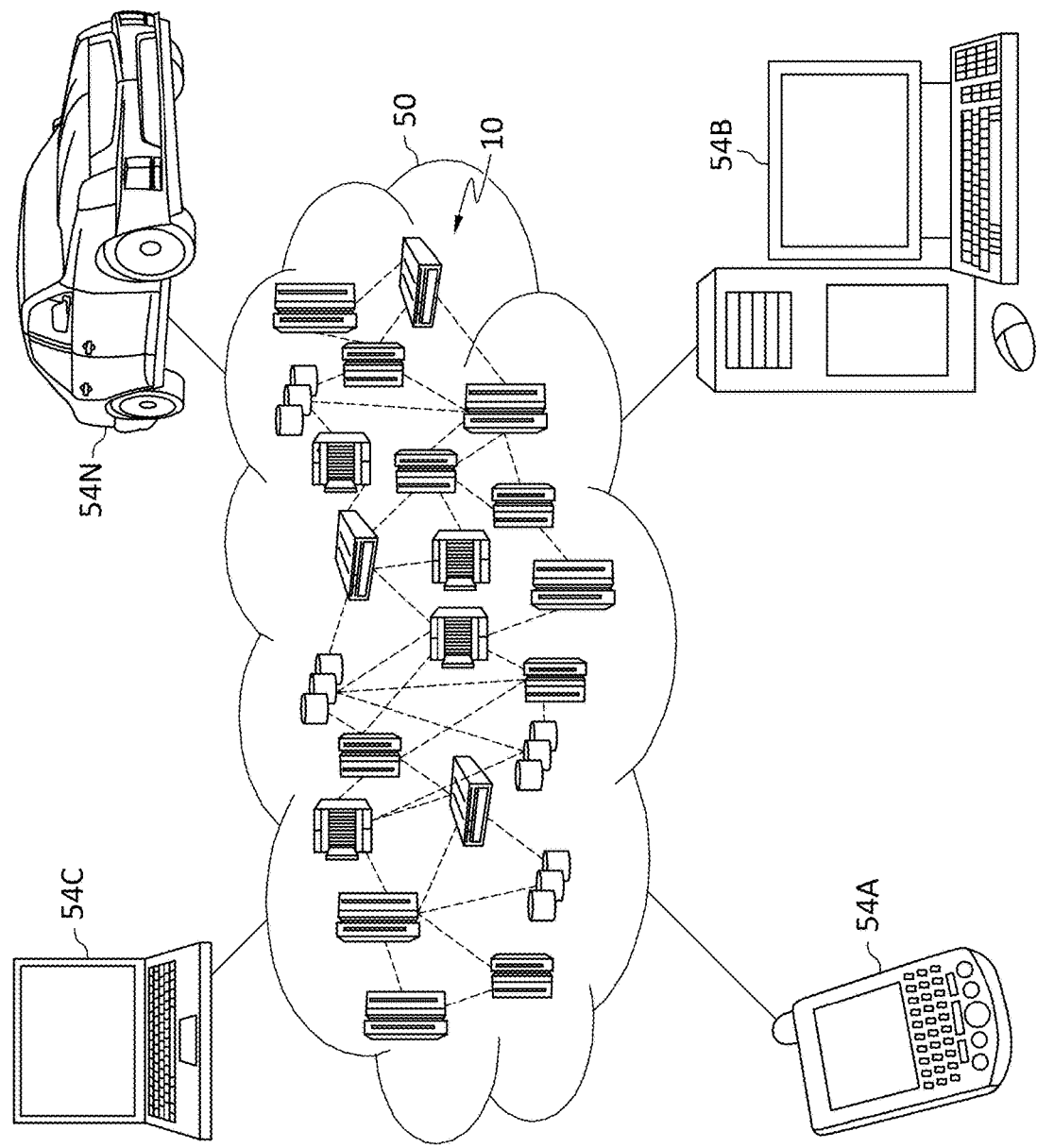
FIG. 5 depicts a cloud computing environment according to various embodiments of the present invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
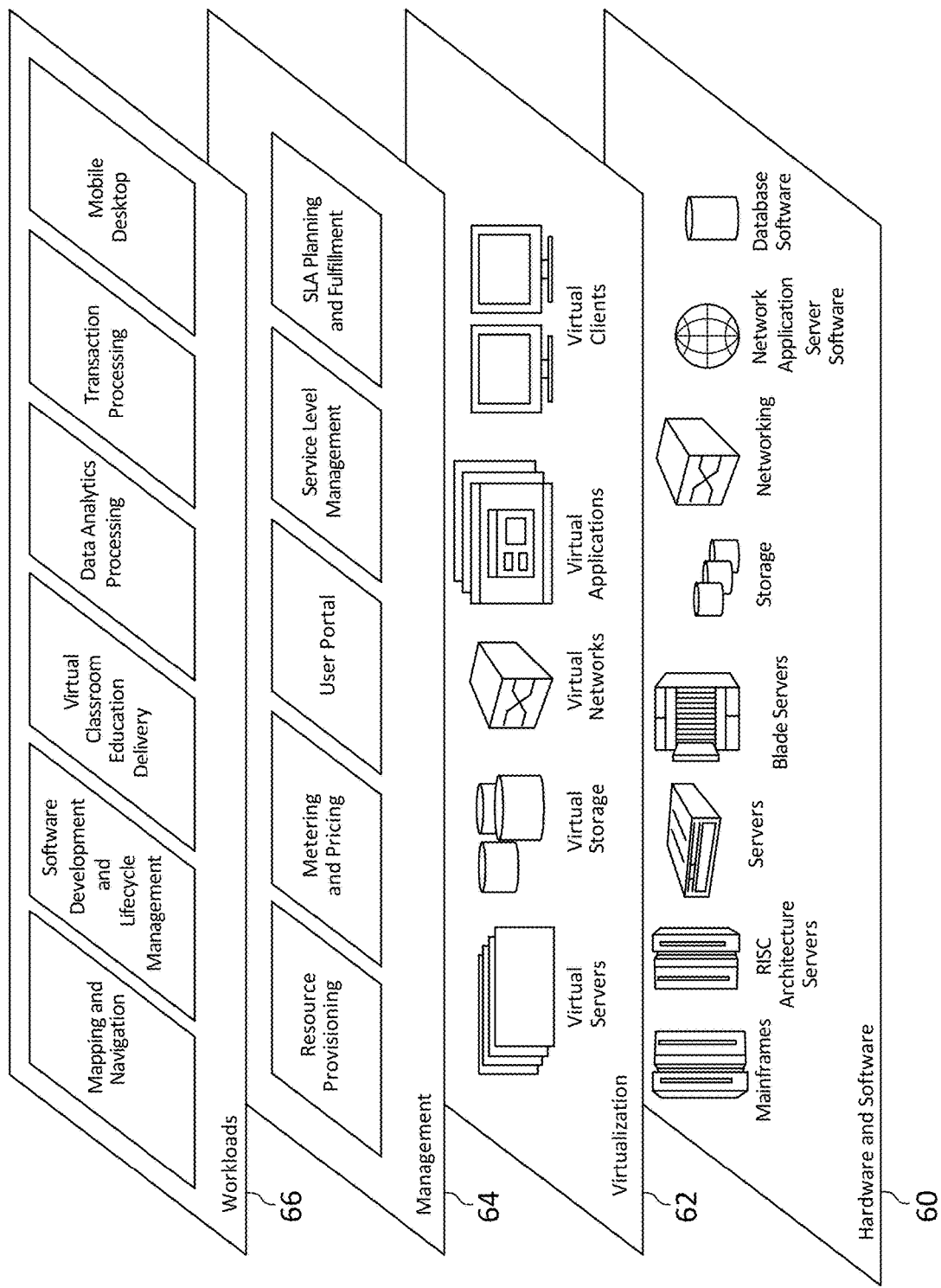
FIG. 6 depicts abstraction model layers according to various embodiments of the present invention.

Referring now to FIG. 6, a set of functional abstraction layers provided by cloud computing environment 50 is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes; RISC (Reduced Instruction Set Computer) architecture based servers; storage devices; networks and networking components. In some embodiments, software components include network application server software.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and mobile desktop.

Computer Program Product

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer implemented method comprising:
receiving, by a computer system, location data of a plurality of renewable energy source stations in a geographic region, power output time series data of each of the plurality of renewable energy source stations, weather time series data of weather parameters corresponding to the plurality of renewable energy source stations, and aggregate power output time series data for the geographic region;
clustering, by the computer system, the plurality of renewable energy source stations according to a clustering metric, resulting in clusters of renewable energy source stations;
building, by the computer system, a machine learning model based on one or more historical relationships between the location data, the power output time series data, the weather time series data, and the aggregate power output time series data, wherein the building comprises deriving one or more algorithms capable of making data-driven decisions to select a representative renewable energy source station through predictive analytics;

for each of the clusters, designating, by the machine learning model in the computer system, a renewable energy source station among the plurality of renewable energy source stations to be the representative renewable energy source station of the each of the clusters based on at least an aggregate power value among the aggregate power output time series data, wherein the machine learning model designates the representative renewable energy source station based on a prediction that a future power value for the representative renewable energy source station will be the best predictor for a future estimation;

for the each of the clusters, determining, by the computer system, a set of features corresponding to the representative renewable energy source station of the each of the clusters, resulting in a determined set of features of the each of the clusters;

for the each of the clusters, executing, by the computer system, a set of logical operations normalizing the aggregate power value based on the power output from the representative renewable energy source station of the each of the clusters with respect to a maximum of aggregate power values in the aggregate power output time series data, resulting in a normalized aggregate output power value of the representative renewable energy source station of the each of the clusters;

for the each of the clusters, executing, by the computer system, a set of logical operations for learning a regression model of the each of the clusters based on the determined set of features of the each of the clusters and the normalized aggregate output power value of the representative renewable energy source station of the each of the clusters, resulting in learned regression models of the clusters of renewable energy source stations;

for the each of the clusters, executing, by the computer system, a set of logical operations de-normalizing a normalized aggregate output power model of the each of the clusters, among the learned regression models, with respect to a maximum possible power value, resulting in a de-normalized aggregate output power model of the each of the clusters;

executing, by the computer system, a set of logical operations combining the learned regression models of the clusters of renewable energy source stations with respect to the de-normalized aggregate output power model of the each of the clusters, resulting in a combined model for aggregate power of the plurality of renewable energy source stations;

executing, by the computer system, a set of logical operations applying the combined model to the location data, the power output time series data, the weather time series data, and power output of representative renewable energy source stations for a particular day, among the power output time series data, resulting in a predicted total aggregate power production value of the plurality of renewable energy source stations for the particular day, and applying the predicted total aggregate power production value of the plurality of renewable energy source stations to integrate the power output of the plurality of renewable energy source stations into an electrical grid for the particular day.

2. The method of claim 1 wherein the location data describe locations of the plurality of renewable energy source stations.

3. The method of claim 1 wherein the clustering comprises choosing the clustering metric based on the location data, the power output time series data, and the weather time series data.

4. The method of claim 1 wherein the designating comprises designating the representative renewable energy source station based on representative metrics including at least a center of the corresponding cluster and a correlation value indicating a correlation of the renewable energy source station to the aggregate power value.

5. The method of claim 1 wherein the set of features comprises a power output value, among the power output time series data, of the representative renewable energy source station, weather data, among the weather time series data, describing weather at the representative renewable energy source station, and time data at the representative renewable energy source station.

6. The method of claim 1 wherein the normalizing comprises calculating, by the computer system, a mapping from a power output value, among the power output time series data, of the representative renewable energy source station of the each of the clusters and the determined set of features of the each of the clusters, to the aggregate power value.

7. The method of claim 6 wherein the normalizing comprising executing, by the computer system, a set of logical operations normalizing the aggregate power value to the maximum possible power value.

8. The method of claim 7 wherein the normalizing the aggregate power value to the maximum possible power value comprises executing, by the computer system, a set of logical operations normalizing the aggregate power output time series data by dividing each power value $P_t$, among the aggregate power output time series data, at time t, by the maximum possible power value, $P_{max,t}$, at time t.

9. The method of claim 7 wherein the plurality of renewable energy source stations comprises a plurality of photovoltaic stations.

10. The method of claim 9 further comprising:
in response to detecting by the computer system a lower aggregate power value of the plurality of photovoltaic stations, executing, by the computer system, a set of logical operations scaling the lower aggregate power value to a scaled power value on a clear-sky day based on the weather time series data of weather parameters of representative photovoltaic stations among the plurality of photovoltaic stations; and
using, by the computer system, the scaled power value as the aggregate power value in the normalizing the aggregate power value to the maximum possible power value.

11. The method of claim 9 further comprising detecting, by the computer system, at least one change to an installed capacity of the plurality of photovoltaic stations.

12. The method of claim 11 wherein the detecting comprises:
receiving, by the computer system, solar irradiance yield data of correlated cluster regions of the plurality of photovoltaic stations;
for each of the correlated cluster regions, calculating, by the computer system, a mapping from the solar irradiance yield data, E, to an actual aggregate power value, $P_{t,act}$, in a sliding window, W, with a coefficient, c(t), at time t; and in response to determining that a regression coefficient differential, |c(t)-c(W)|, of the sliding window, W, exceeds a threshold value, $c_{th}$, resetting, by the computer system, the maximum power value, $P_{max\_curr}$, of the plurality of photovoltaic stations to the actual aggregate power value, $P_{t,act}$.

13. The method of claim 11 wherein the applying comprises:

in response to the detecting the at least one change to the installed capacity of the plurality of photovoltaic stations, setting, by the computer system, the maximum power value, $P_{max\_curr}$, of the plurality of photovoltaic stations to a maximum power value of the plurality of photovoltaic stations at an end of the learning;

in response to the setting, executing, by the computer system, a set of logical operations scaling the normalized aggregate output power value of the representative renewable energy source station of the each of the clusters by the maximum power value, $P_{max\_curr}$; and in response to determining that an actual aggregate power value, $P_{t,act}$, is greater than the maximum power value, $P_{max\_curr}$, updating, by the computer system, the maximum power value, $P_{max\_curr}$.

14. The method of claim 1 wherein the de-normalizing comprises scaling, by the computer system, the normalized aggregate output power model of the each of the clusters, among the learned regression models, by the maximum possible power value, resulting in the de-normalized aggregate output power model of the each of the clusters.

15. A system comprising:

a memory; and a processor in communication with the memory, the processor configured to perform a method comprising receiving, by a computer system, location data of a plurality of renewable energy source stations in a geographic region, power output time series data of each of the plurality of renewable energy source stations, weather time series data of weather parameters corresponding to the plurality of renewable energy source stations, and aggregate power output time series data for the geographic region, clustering, by the computer system, the plurality of renewable energy source stations according to a clustering metric, resulting in clusters of renewable energy source stations, building, by the computer system, a machine learning model based on one or more historical relationships between the location data, the power output time series data, the weather time series data, and the aggregate power output time series data, wherein the building comprises deriving one or more algorithms capable of making data-driven decisions to select a representative renewable energy source station through predictive analysis;

for each of the clusters, designating, by the machine learning model in the computer system, a renewable energy source station among the plurality of renewable energy source stations to be the representative renewable energy source station of the each of the clusters based on at least an aggregate power value among the aggregate power output time series data, wherein the machine learning model designates the representative renewable energy source station based on a prediction that a future power value for the representative renewable energy source station will be the best predictor for a future estimation, for the each of the clusters, determining, by the computer system, a set of features corresponding to the representative renewable energy source station of the each of the clusters, resulting in a determined set of features of the each of the clusters, for the each of the clusters, executing, by the computer system, a set of logical operations normalizing the aggregate power value based on the power output from the representative renewable energy source station of the each of the clusters with respect to a maximum of aggregate power values in the aggregate power output time series data, resulting in a normalized aggregate output power value of the representative renewable energy source station of the each of the clusters, for the each of the clusters, executing, by the computer system, a set of logical operations for learning a regression model of the each of the clusters based on the determined set of features of the each of the clusters and the normalized aggregate output power value of the representative renewable energy source station of the each of the clusters, resulting in learned regression models of the clusters of renewable energy source stations, for the each of the clusters, executing, by the computer system, a set of logical operations de-normalizing a normalized aggregate output power model of the each of the clusters, among the learned regression models, with respect to a maximum possible power value, resulting in a de-normalized aggregate output power model of the each of the clusters, executing, by the computer system, a set of logical operations combining the learned regression models of the clusters of renewable energy source stations with respect to the de-normalized aggregate output power model of the each of the clusters, resulting in a combined model for aggregate power of the plurality of renewable energy source stations, executing, by the computer system, a set of logical operations applying the combined model to the location data, the power output time series data, the weather time series data, and power output of representative renewable energy source stations for a particular day, among the power output time series data, resulting in a predicted total aggregate power production value of the plurality of renewable energy source stations for the particular day, and applying the predicted total aggregate power production value of the plurality of renewable energy source stations to integrate the power output of the plurality of renewable energy source stations into an electrical grid for the particular day.

16. The system of claim 15 wherein the normalizing comprises executing, by the computer system, a set of logical operations normalizing the aggregate power value to the maximum possible power value.

17. The system of claim 16 wherein the normalizing the aggregate power value to the maximum possible power value comprises executing, by the computer system, a set of logical operations normalizing the aggregate power output time series data by dividing each power value $P_t$ among the aggregate power output time series data, at time t, by the maximum possible power value, $P_{max,t}$, at time t.

18. The system of claim 16 wherein the plurality of renewable energy source stations comprises a plurality of photovoltaic stations.

19. The system of claim 18 wherein the method further comprises:
- in response to detecting by the computer system a lower aggregate power value of the plurality of photovoltaic stations, executing, by the computer system, a set of logical operations scaling the lower aggregate power value to a scaled power value on a clear-sky day based on the weather time series data of weather parameters of representative photovoltaic stations among the plurality of photovoltaic stations; and
- using, by the computer system, the scaled power value as the aggregate power value in the normalizing the aggregate power value to the maximum possible power value.

20. A computer program product comprising a computer readable storage medium having program instructions embodied therewith, the program instructions executable by a processor to cause the processor to perform a method comprising:
- receiving, by a computer system, location data of a plurality of renewable energy source stations in a geographic region, power output time series data of each of the plurality of renewable energy source stations, weather time series data of weather parameters corresponding to the plurality of renewable energy source stations, and aggregate power output time series data for the geographic region;
- clustering, by the computer system, the plurality of renewable energy source stations according to a clustering metric, resulting in clusters of renewable energy source stations;
- building, by the computer system, a machine learning model based on one or more historical relationships between the location data, the power output time series data, the weather time series data, and the aggregate power output time series data,
    - wherein the building comprises deriving one or more algorithms capable of making data-driven decisions to select a representative renewable energy source station through predictive analytics;
- for each of the clusters, designating, by the machine learning model in the computer system, a renewable energy source station among the plurality of renewable energy source stations to be the representative renewable energy source station of the each of the clusters based on at least an aggregate power value among the aggregate power output time series data, wherein the machine learning model designates the representative renewable energy source station based on a prediction that a future power value for the representative renewable energy source station will be the best predictor for a future estimation;
- for the each of the clusters, determining, by the computer system, a set of features corresponding to the representative renewable energy source station of the each of the clusters, resulting in a determined set of features of the each of the clusters;
- for the each of the clusters, executing, by the computer system, a set of logical operations for normalizing the aggregate power value based on the power output from the representative renewable energy source station of the each of the clusters with respect to a maximum of aggregate power values in the aggregate power output time series data, resulting in a normalized aggregate output power value of the representative renewable energy source station of the each of the clusters;
- for the each of the clusters, executing, by the computer system, a set of logical operations learning a regression model of the each of the clusters based on the determined set of features of the each of the clusters and the normalized aggregate output power value of the representative renewable energy source station of the each of the clusters, resulting in learned regression models of the clusters of renewable energy source stations;
- for the each of the clusters, executing, by the computer system, a set of logical operations de-normalizing a normalized aggregate output power model of the each of the clusters, among the learned regression models, with respect to a maximum possible power value, resulting in a de-normalized aggregate output power model of the each of the clusters;
- executing, by the computer system, a set of logical operations combining the learned regression models of the clusters of renewable energy source stations with respect to the de-normalized aggregate output power model of the each of the clusters, resulting in a combined model for aggregate power of the plurality of renewable energy source stations; and
- executing, by the computer system, a set of logical operations applying the combined model to the location data, the power output time series data, the weather time series data, and power output of representative renewable energy source stations for a particular day, among the power output time series data, resulting in a predicted total aggregate power production value of the plurality of renewable energy source stations for the particular day, and
- applying the predicted total aggregate power production value of the plurality of renewable energy source stations to integrate the power output of the plurality of renewable energy source stations into an electrical grid for the particular day.

* * * * *